United States Patent [19]

Weinberger et al.

[11] Patent Number: 5,214,772
[45] Date of Patent: May 25, 1993

[54] SYSTEM FOR AUTOMATICALLY MONITORING COPIERS FROM A REMOTE LOCATION

[75] Inventors: Joseph Weinberger, East Brunswick, N.J.; Gary Bricault; James Laird, both of Rochester, N.Y.

[73] Assignee: Joseph Weinberger, East Brunswick, N.J.

[21] Appl. No.: 567,388

[22] Filed: Aug. 14, 1990

Related U.S. Application Data

[63] Continuation-in-part of Ser. No. 450,605, Dec. 13, 1989, Pat. No. 5,084,875.

[51] Int. Cl.[5] .......................... G06F 11/00; G06F 3/00
[52] U.S. Cl. .................................. 395/575; 395/500;
371/29.1; 371/16.4; 355/202; 355/204;
355/205; 364/DIG. 2; 364/943.9; 364/944.7;
364/921.8; 364/927.92; 364/927.95;
364/927.99; 364/928; 364/928.2; 364/928.6;
364/933.8; 364/939; 364/939.3; 364/939.5;
364/940; 364/940.1
[58] Field of Search .......................... 371/16.4, 29.1;
395/200, 575, 560, 725; 355/200, 202, 203, 204, 205, 207

[56] References Cited

U.S. PATENT DOCUMENTS

| | | | |
|---|---|---|---|
| 3,623,013 | 11/1971 | Perkins et al. | 395/725 |
| 4,144,550 | 3/1979 | Donohue et al. | 364/107 |
| 4,213,694 | 7/1980 | Kuseski | 355/26 |
| 4,311,986 | 1/1982 | Yee | 340/825.63 |
| 4,330,847 | 5/1982 | Kuseski | 395/775 |
| 4,463,418 | 7/1984 | O'Quin, II et al. | 395/575 |
| 4,497,037 | 1/1985 | Kato et al. | 355/202 |
| 4,545,013 | 10/1985 | Lyon et al. | 395/200 |
| 4,623,244 | 11/1986 | Andrews et al. | 355/24 |
| 4,633,412 | 12/1986 | Ebert, Jr. et al. | 364/493 |
| 4,652,698 | 3/1987 | Hale et al. | 380/24 |
| 4,695,946 | 9/1987 | Andreasen et al. | 395/575 |
| 4,712,213 | 12/1987 | Warwick et al. | 371/29.1 |
| 4,870,644 | 9/1989 | Sherry et al. | 371/16.1 |
| 4,947,397 | 8/1990 | Sobel et al. | 371/16.4 |
| 4,962,368 | 10/1990 | Dobrzanski et al. | 348/514 |
| 5,016,059 | 5/1991 | Smeiman | 355/308 |
| 5,038,319 | 8/1991 | Carter et al. | 395/700 |
| 5,057,866 | 10/1991 | Hill, Jr. et al. | 355/200 |
| 5,077,582 | 12/1991 | Kravetta et al. | 355/206 |
| 5,084,875 | 1/1992 | Weinberger et al. | 371/29.1 |

OTHER PUBLICATIONS

Kodak Ektaprint brochure, Copyright, Eastman Kodak Company 1986.
Xerox 1090 Copier Electronic Data Interface Operator Guide and Installation Instructions, Nov. 1988.
Rochester Democrat and Chronicle, by David Lindley, Mar. 28, 1990.
Eastman Kodak Company, 1986; Kodak Telassistance Network; pp. 1–4.

*Primary Examiner*—Paul V. Kulik
*Attorney, Agent, or Firm*—Hedman, Gibson & Costigan

[57] ABSTRACT

A system for automatically, remotely monitoring the operational status of and initiating operational commands in one or more copy machines each having a copier computer therein for determining copier status and controlling operation of the copy machine comprising interface means in the copier to monitor status information of the remote location from the copier computer and receive and input operational commands from the remote location into the copy machine and communication means between the individual copiers and the remote location. The system utilizes a scanner to respectively monitor the copiers which can poll each of the copiers at a uniform rate or, when requested by the user at the central location, vary the poll rate of one or more of the copiers to poll the selected copier with increased regularity, slowing the polling rate of the other copiers, to provide a real-time monitoring of the selected copier. The system provides for the operation of the copier from the remote location to allow the user at the remote location to operate the copier, i.e. for the diagnosis and correction of a detected problem.

2 Claims, 36 Drawing Sheets

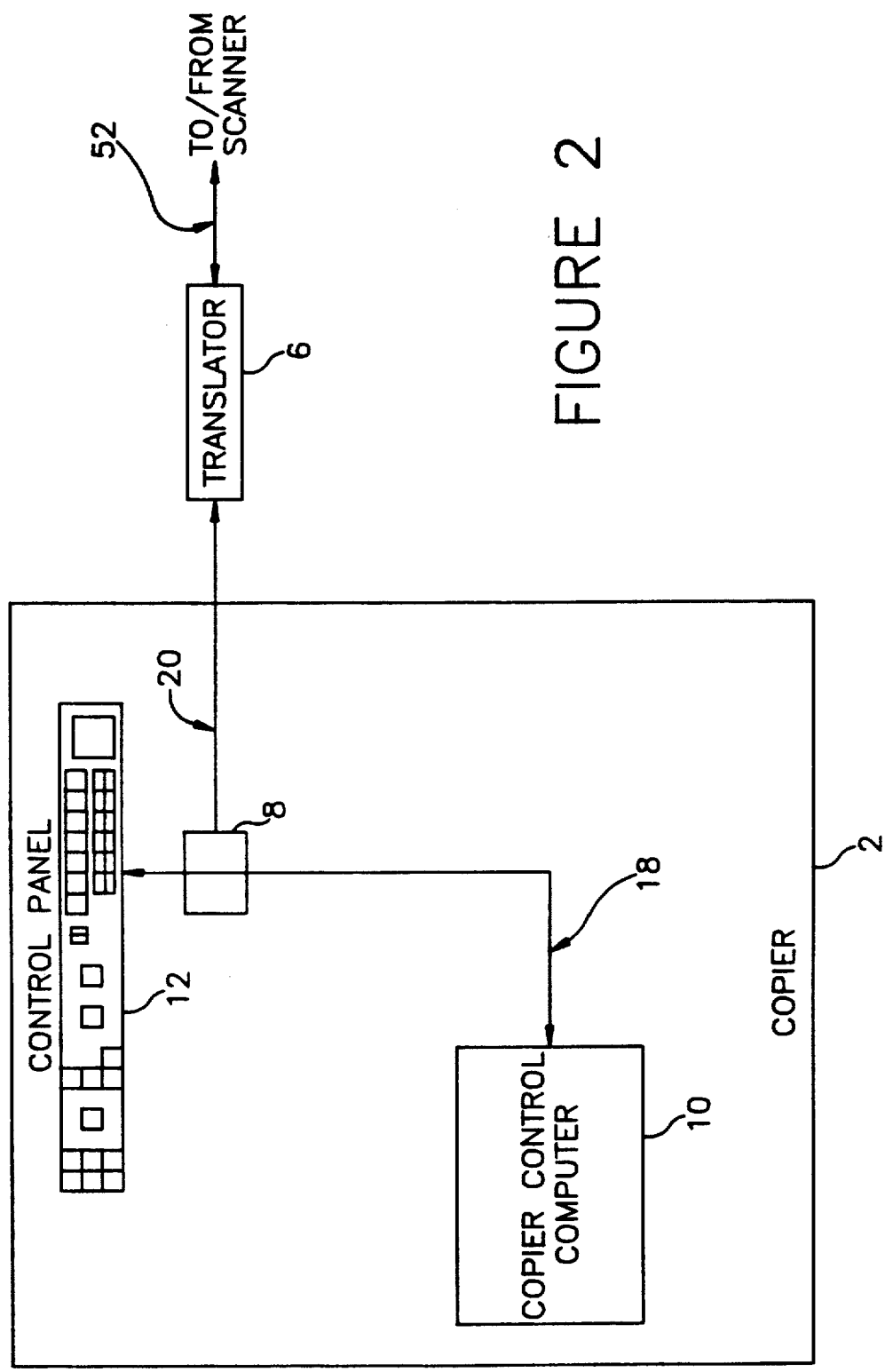

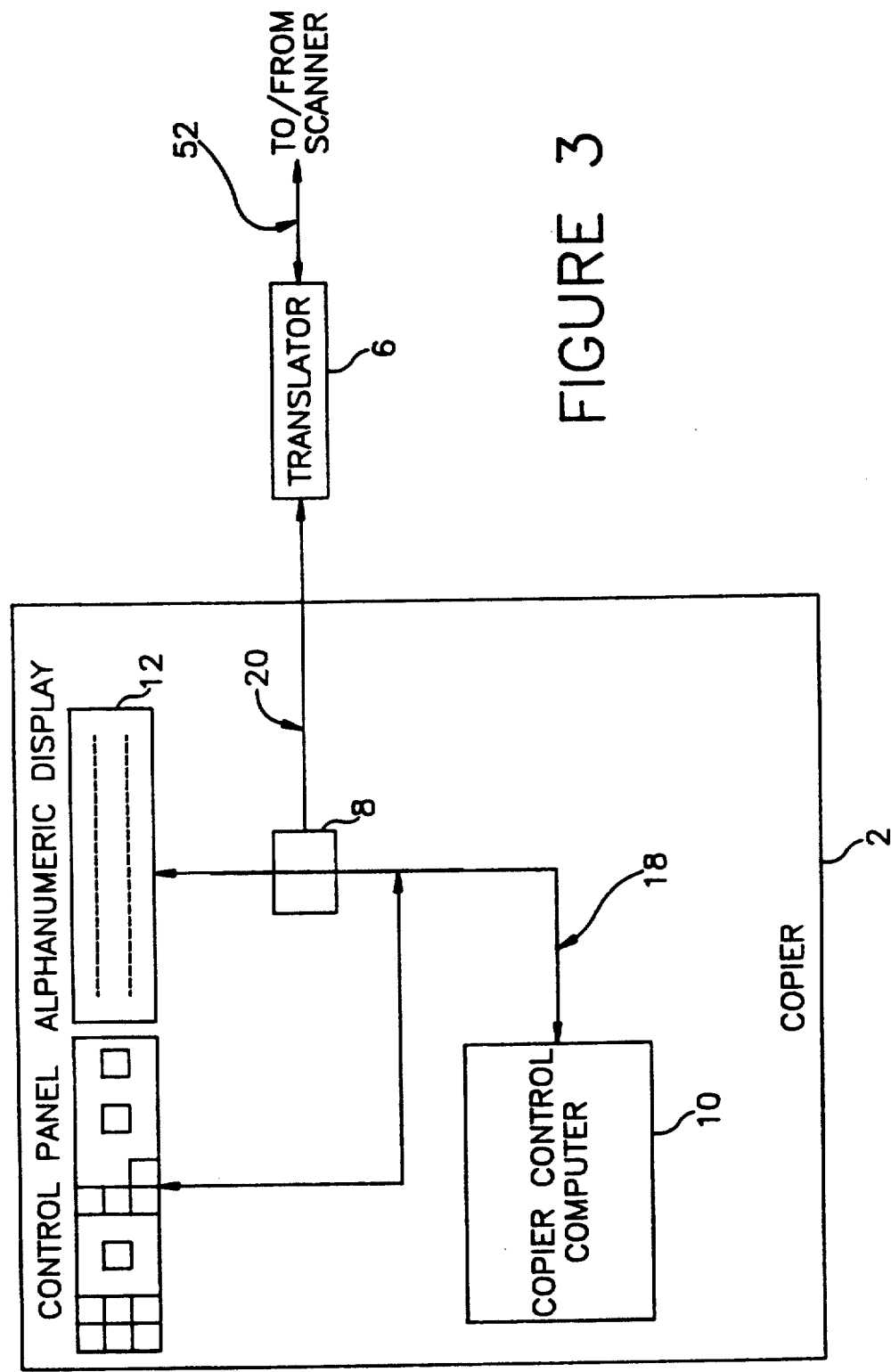

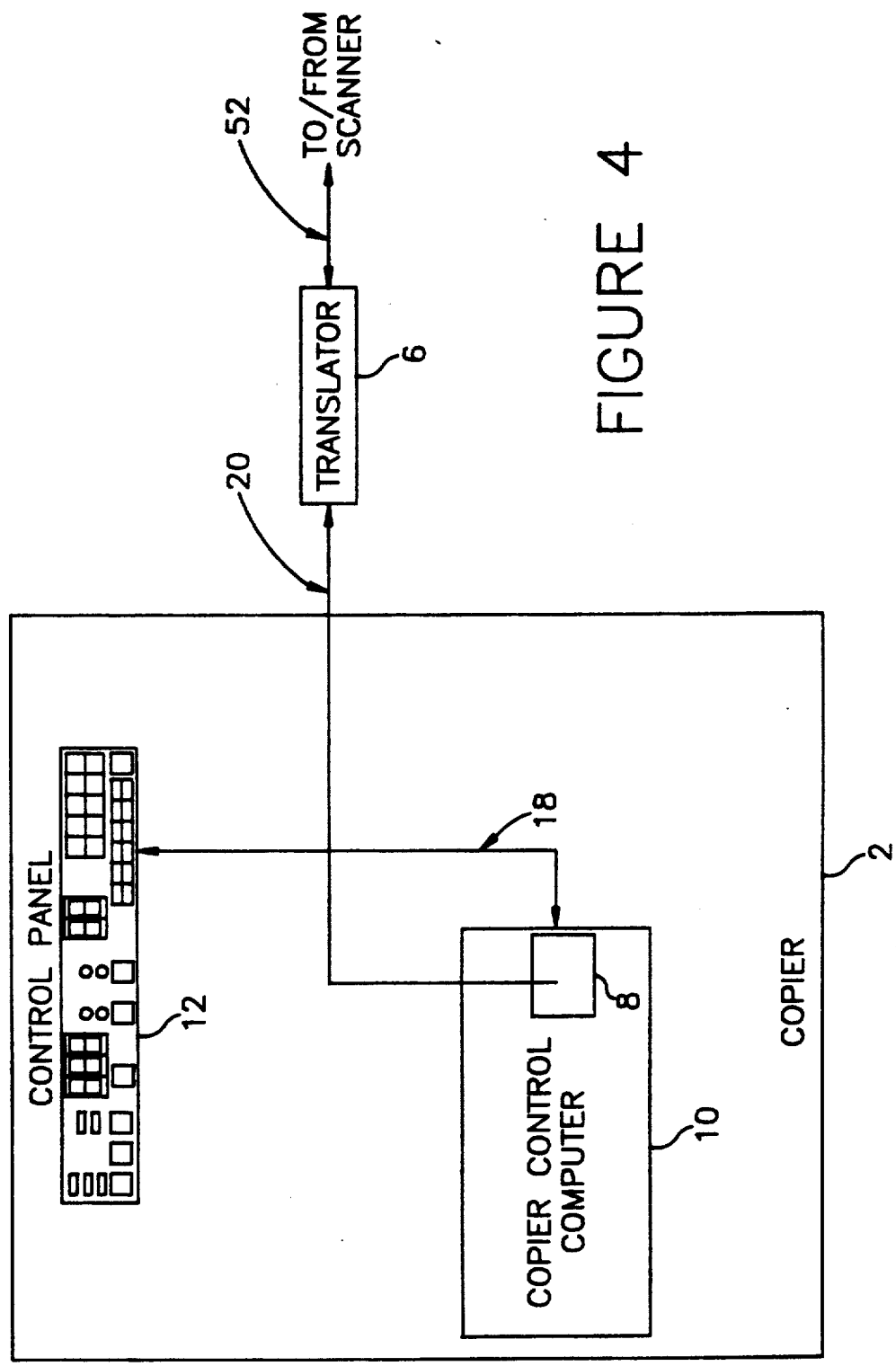

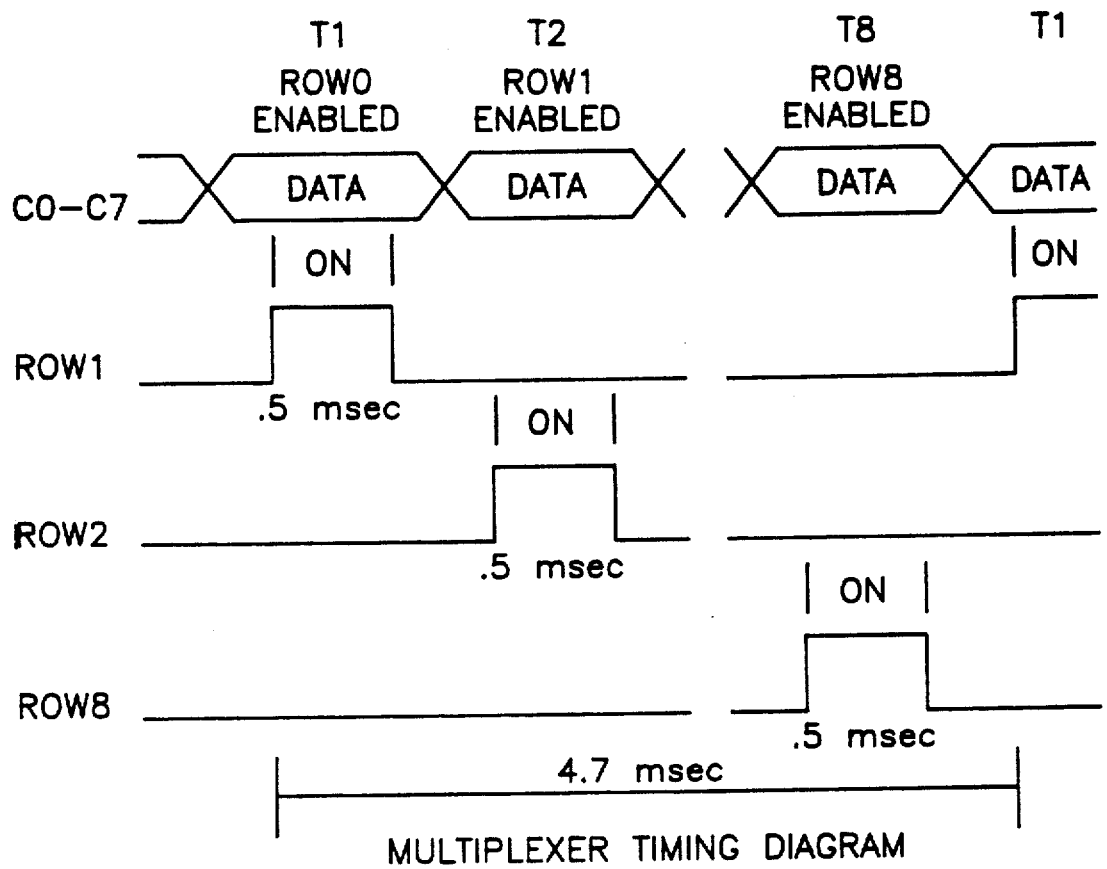
MULTIPLEXER TIMING DIAGRAM
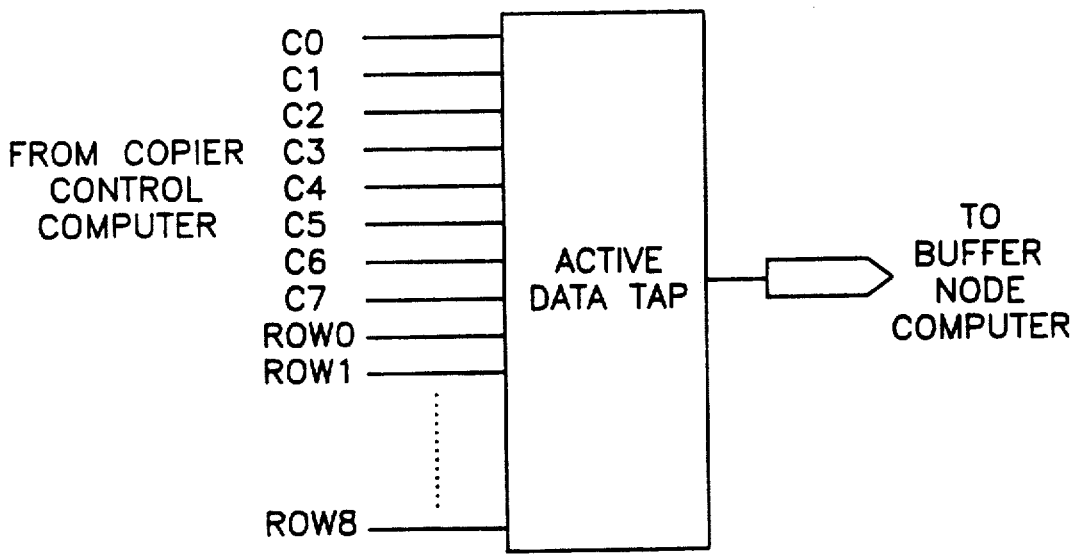
FIGURE 6
SHEET 2 OF 2

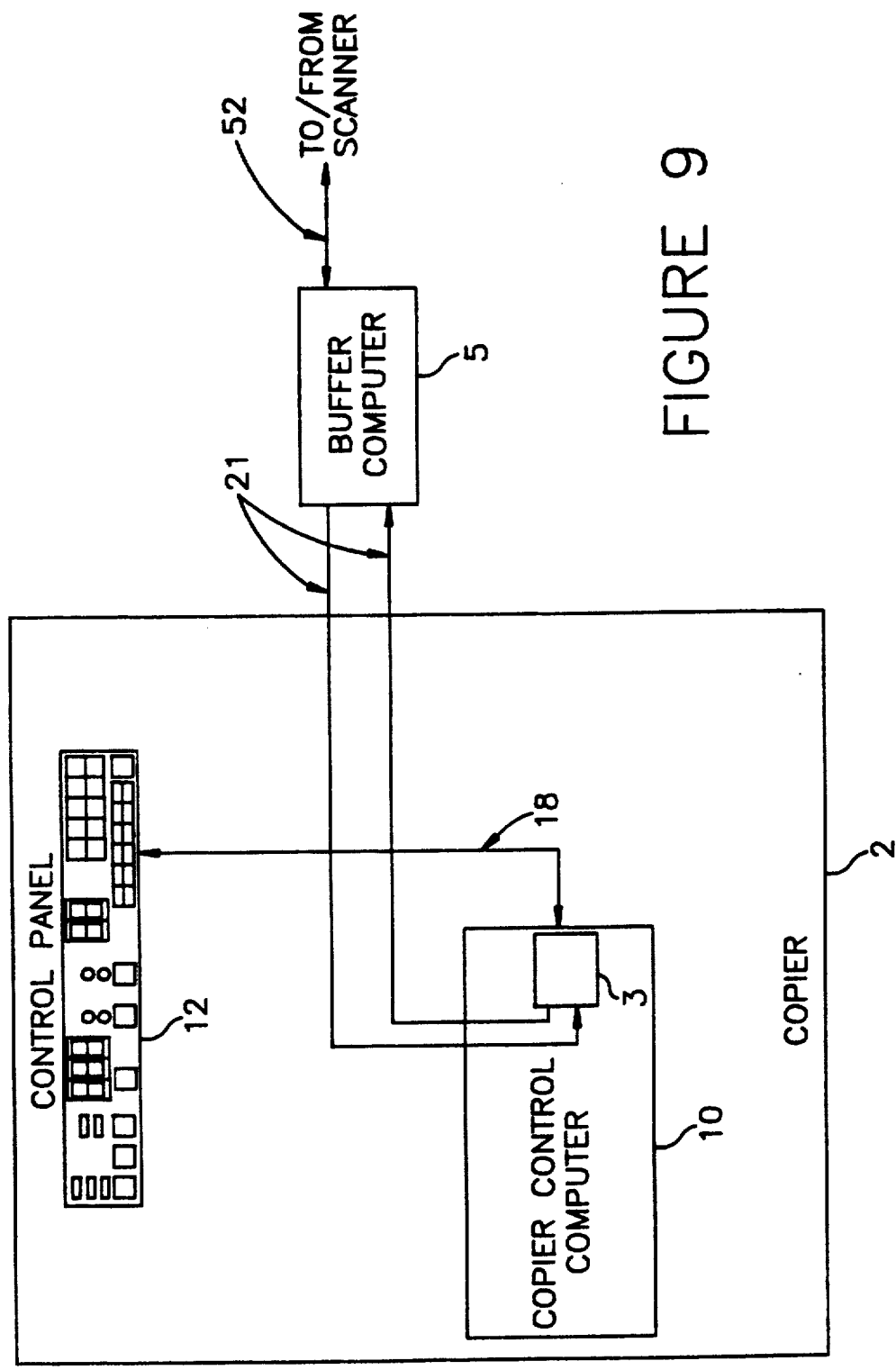

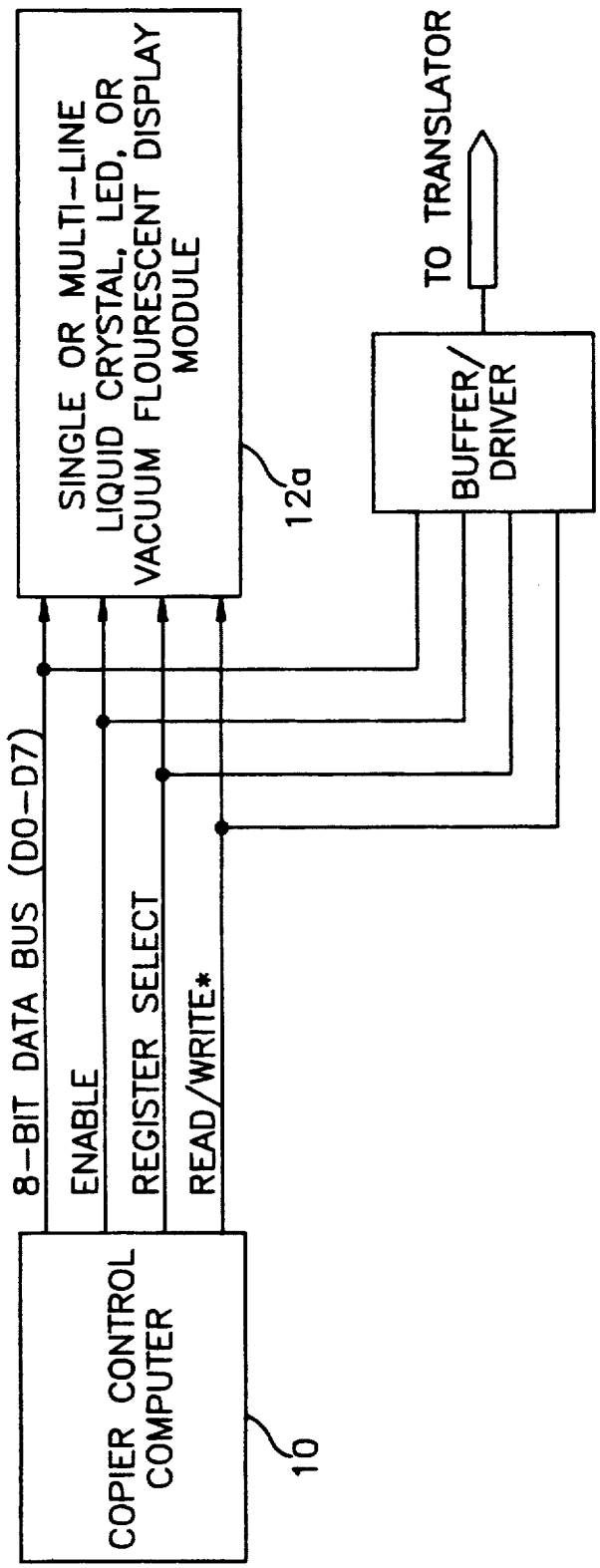
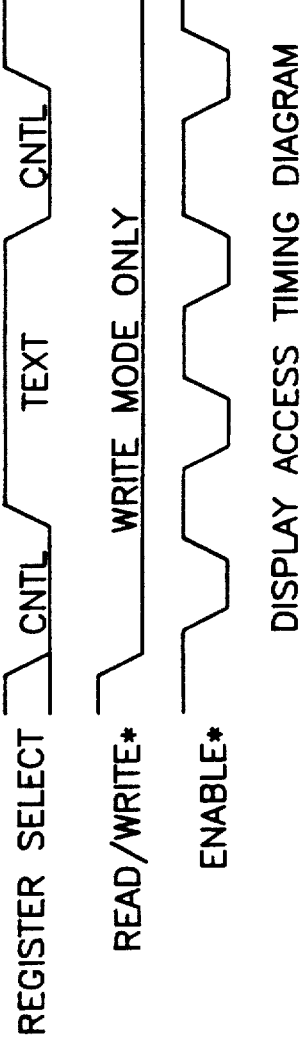
FIGURE 16

COPIER MULTIPLEXED KEYBOARD WITH
REMOTE KEYSTROKE MONITORING AND
REMOTE KEYSTROKE GENERATOR CIRCUITRY

← COPIER CONTROL PANEL | SMART DATA TAP →

MULTIPLEXED KEYBOARD TIMING DIAGRAM

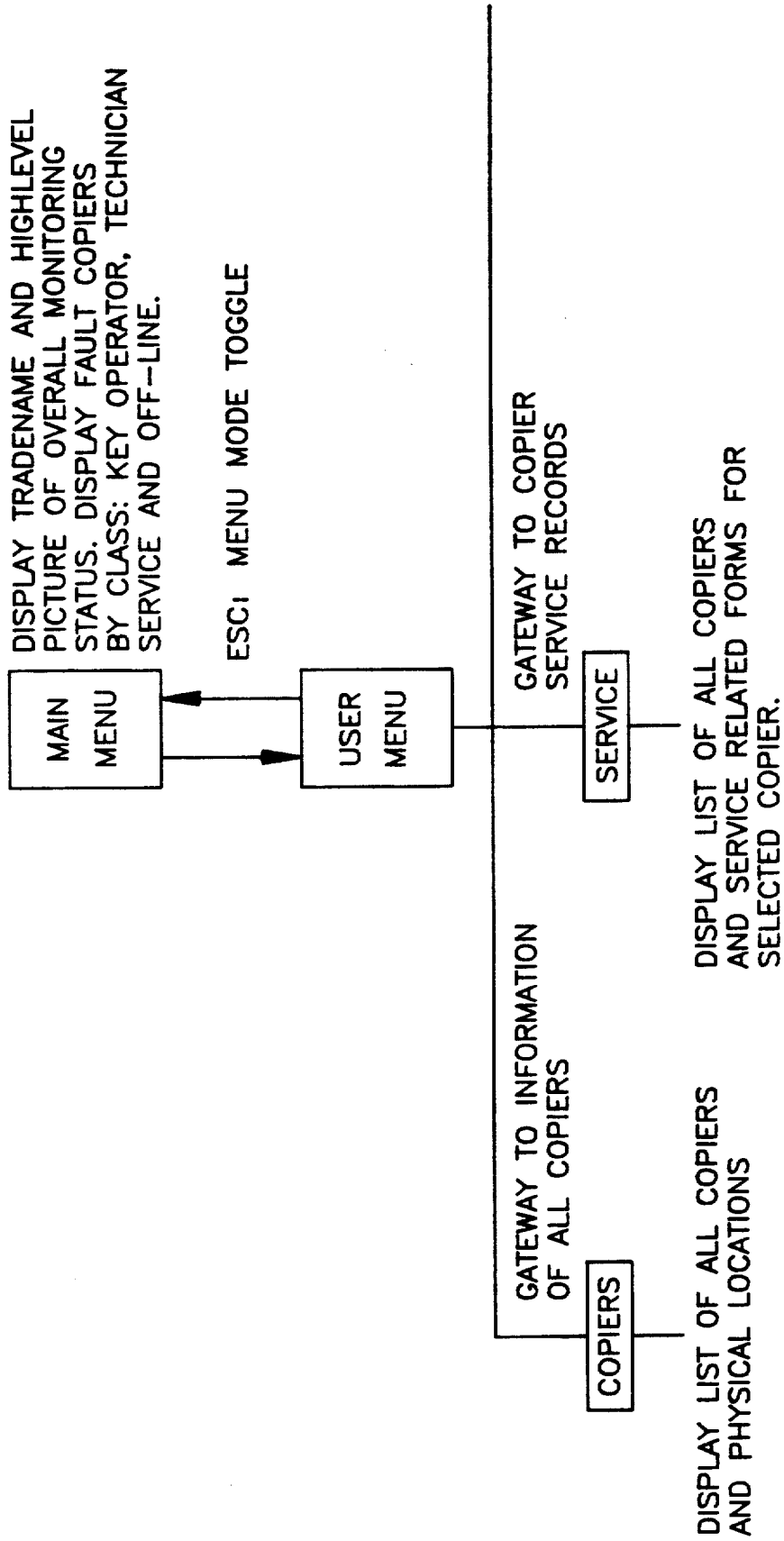

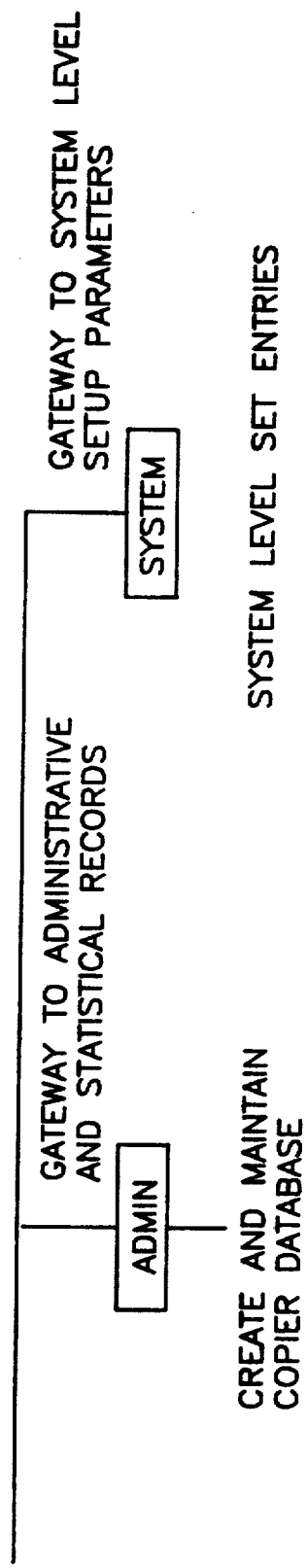

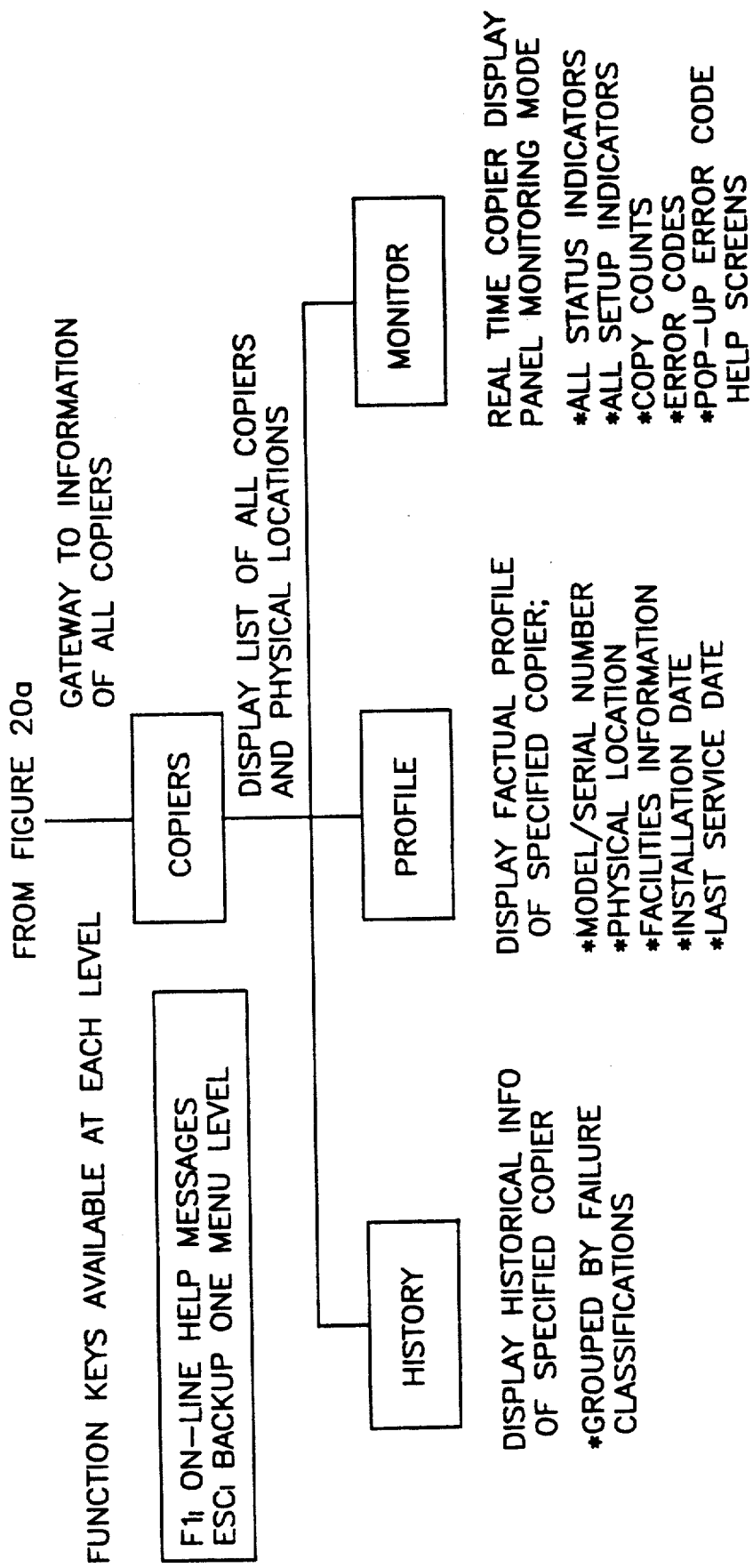

```
-------------------- MONITOR --------------------

ID:         001
TYPES:      X-1025
LOCATION:   LAB
STATUS:     OFFLINE

CLEAR              INSERT             PLEASE
PAPER              PAPER              WAIT
PATH               TRAY

CHECK
                                                        PAPER
                                                        SIZE

ADD                JOB                READY
DRY                INTERRUPT          TO
INK                                   COPY

CHECK
                                                        SORTER

REPLACE
SUMP

ADD
PAPER

NUMBER TO COPY:   00
CONTRAST:         NORMAL

ORIGINAL SIZE:
                           COPY PAPER SIZE:
                           PERCENT:        000                  TRAY #0
```

1—HELP    ESC—EXIT MONITOR    SCREEN 6:    MONITOR 1025 COPIER

FIGURE 21

```
                    ┌─ MONITOR ─────────────────────┐
                    │         ERROR CODES           │
                    │                               │
ID:                 │                               │
TYPES:              │                               │
LOCATION:           │                               │
STATUS:             │                          ay #0│
                    │                               │
              A1  — CLEAR MISFED ORIGINALS
              A2  — CLEAR MISFED ORIGINALS
              A6  — RECOPY LAST ORIGINAL
              A7  — RECOPY LAST 2 ORIGINAL
              A9  — DOCUMENT HANDLER FAILURE
CLEAR         C1  — REMOVE TRAY 1 — CLEAR MISFED PAPER IN TRAY
PAPER         C2  — REMOVE TRAY 2 — CLEAR MISFED PAPER IN TRAY
PATH          C3  — REMOVE TRAY 3 — CLEAR MISFED PAPER IN TRAY
              C9  — REMOVE MISFED COPY PAPER AND REFEED
ADD           E1  — CLEAR PAPER PATH FROM CENTER
PAPER         E3  — CLEAR PAPER PATH FROM EXIT
              E5  — CLOSE FRONT COVER
              F1  — CHECK SORTER PATH
              F5  — RETURN SORTER TO CLOSED POSITION
              F8  — SORTER POWER FAILURE
              F9  — SORTER BIN FAILURE
NUMBER        J7  — REPLACE WASTE SUMP
CONTRA        D6  — INSERT KEY COUNTER
              Ux  — CALL FOR SERVICE (U1 — U8)

1—HELP   ESC—EXIT MONITOR

SCREEN 7:     ERROR CODES FOR 1025
```

FIGURE 22

SYSTEM FOR AUTOMATICALLY MONITORING COPIERS FROM A REMOTE LOCATION

REFERENCE TO RELATED APPLICATIONS

This application is a continuation-in-part of Ser. No. 07/450,605, filed Dec. 13, 1989, now U.S. Pat. No. 5,084,875.

FIELD OF THE INVENTION

The present invention relates to a system for remotely monitoring the status of a plurality of copiers from a central location.

BACKGROUND OF THE INVENTION

Several methods for reporting copy machine status are known in the art. The simplest is a series of indicators arranged remotely as a "scoreboard" to show the status of each copier in a limited fashion. This approach, however, is only able to indicate gross failures and is not a practical monitoring system when there are a large number of copiers distributed over a large area or on multiple floors of a building.

A technique for remotely monitoring a number of copiers is the XEROX REMOTE INTERACTIVE COMMUNICATIONS (RIC) system which interfaces with several different XEROX copiers (such as the 1090) and relays status information over telephone lines to a central service office. The RIC has been designed primarily to collect billing information. In addition, it also collects ongoing failure information that it locally analyzes for failure trends, i.e., a sudden increase in jams in the fuser section. If a failure trend is recognized, the RIC will report its failure analysis to the service office. The RIC adapter consists of a dedicated microprocessor controller that plugs into a special data port at the copier and an auto-dial modem for direct hookup to a telephone line.

The RIC system has the disadvantage in that it is designed to interface with only a limited subset of XEROX copiers. To accommodate for the different copier models of both like and different manufacturers, a translator described in Ser. No. 07/450,605, filed Dec. 13, 1989, now U.S. Pat. No. 5,084,875, which corresponds to the specific copier structure, is used to provide uniform interface between the copier and the central data collection point. The translator is a single device that is responsible for translating the incoming copier information into uniform signals to be read by the central data collection point as well as communicating with the remotely located scanner/multiplexer to accept and transfer information with the central data collection point.

There is the possibility that in this type of translator which is based on a single microprocessor can be overloaded and degrade system performance. An object of the present invention is to overcome this by using two separate microprocessor systems—one to translate the incoming copier information and one to communicate with the central data collection point. The main object of the present invention, however, is to provide a method of linking a plurality of copiers, through hardware and software, in such a way so as to provide continuous, automatic monitoring of copier status, in real time or quasi real time including error conditions, from a central location.

It is a further object of the present invention to monitor various types of copiers, i.e., static and dynamic, with a single system.

SUMMARY OF THE INVENTION

A system for automatically monitoring the operational status of one or more copier machines from a remote location, each copier machine having a copier control computer for determining copier status, comprising means for monitoring status information from the copier control computer, a translator associated with each copier including a means to adapt status information from the specific copier machine into uniform status information for transmission to the remote location and means for transmitting information between the translator of each copier and the remote location.

BRIEF DESCRIPTION OF THE DRAWINGS

The following drawings, in which like reference characters indicate like parts, are illustrative of embodiments of the invention and are not intended to limit the scope of the invention in any manner as encompassed by the claims forming a part hereof.

FIG. 2 is a schematic block diagram of a static copier interface and passive data tap on the copier control data cable for use with the present system.

FIG. 4 is a schematic block diagram of a dynamic copier interface and passive data tap on the copier control data cable for use with the present system.

FIG. 4 is a schematic block diagram of a static copier interface and passive data tap located on the copier control computer.

FIG. 9 is a schematic block diagram of a static copier with an active data tap and buffer node computer.

FIG. 16 is a schematic block diagram of a parallel data transmission technique from a copier control computer to the control panel display.

FIG. 20A is an overview menu selection chart for use with the central computer.

FIG. 20B is an expanded view of the information available from the COPIER menu selection.

FIG. 21 is a screen dump of the real-time monitoring mode for a Xerox 1025 copier.

FIG. 22 is a screen dump of the on-line help facility for fault codes.

DESCRIPTION OF THE PREFERRED EMBODIMENT

Figure 1:
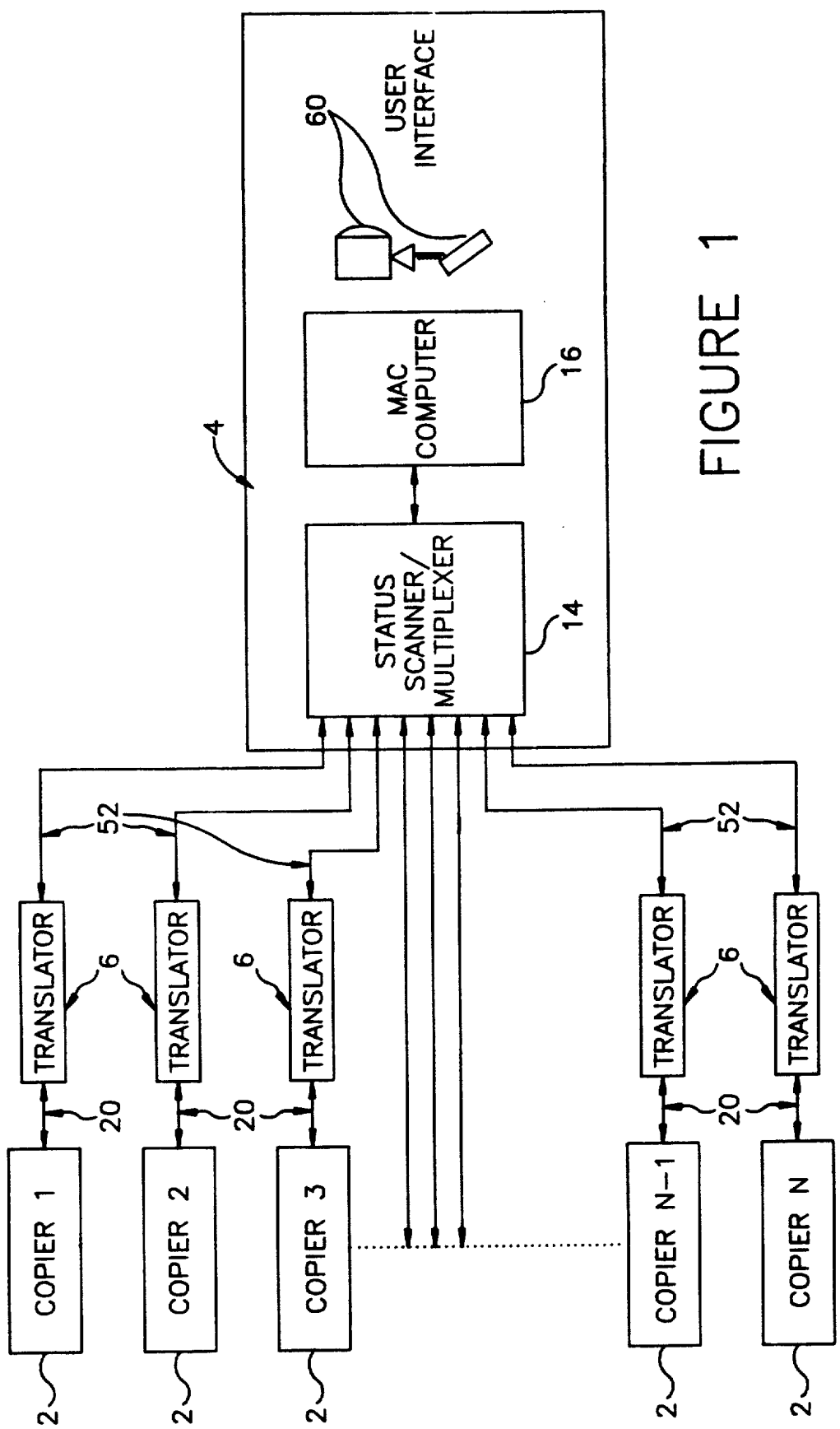
FIG. 1 is a schematic block diagram of the system of the present invention.

With reference to the drawings, and particularly FIG. 1, the present copier monitoring system is capable of automatically monitoring, collecting and storing copier profiles, service records and diagnostics from a plurality of copier machines 2, located at various locations, from a central location or data collection point 4. To accommodate for the differences between various copier models of both like and different manufacturers, a translator 6 is used to provide a uniform interface between the copier and the central data collection point 4 for the copier status information. A translator 6 is a microcomputer with specialized hardware and software that is customized to the particular copier and serves as an addressable node in the network. The translator 6 is located at each copier site and communicates with the copier 2 through the use of a data tap 8 (see FIGS. 2, 3 and 4) which monitors the status information transmitted from the copier control computer 10 to the copier status display 12 along a control panel data cable 18.

The current copier status information is stored in and transmitted by the translator 6 along a communication means, shown as line 52 to a data collection computer 16 at the central location 4 in response to a poll from a scanner/multiplexer 14 at the central location 4. At the central location 4 the data is processed and stored in a database in the data collection computer 16.

The present system, therefore, links remote copiers to a central data collection point 4 through the use of, generally, a data tap 8 and translator 6 associated with the copier 2 on the customer premises and connected by communication means 52 to a scanner/multiplexer component 14 and status copier data collection component 16 at the central location 4.

Generally, machine status monitoring in a copier is an output function, however, input functions such as operator key strokes from the control panel can be monitored. There are various input/output interfaces or copier control panels 12, depending on the model and manufacturer of the copier. The output interfaces can generally be classified as "static" and "dynamic". In addition to monitoring the output functions it is also desireable to provide remote input operation capabilities such that control panel keystrokes can be remotely generated.

The static type utilizes illuminating indicators, such as light emitting diodes ("LED's"), on a control panel 12 to indicate setup and operational status by either backlighting a transparency or as an indicator adjacent to a label. Using this method the copier control computer 10 directly controls the status indicators by turning them on or off as needed. In certain cases, fault conditions of the copier are indicated by error codes that can be, for example, displayed through the copy counter as a two digit code number. An example of this class of copier is the XEROX model 1025.

The dynamic output type utilizes not only illuminating indicators as before, but also some form of alphanumeric display device that can be altered to represent setup and status information in plain linguistic alphanumeric text. This display device could be a single or multiple line display utilizing technology such as a vacuum fluorescent, liquid crystal or light emitting diodes, or even CRT video displays. In these dynamic copiers the copier control computer 10 passes information over a control panel data cable 18 to the display device's controller which in turn converts the raw data into a formatted display image on the control panel 12. This information stream may be in either a serial or parallel manner. An example of this class of copier is the XEROX model 1040.

In the case of the static display method it may be desirable only to monitor a portion of the status devices because not all of the status devices indicate fault conditions. There are also difficulties interfacing with the static display because of the variety of the characteristics of different status devices and circuit operating voltages that exist in the various models of different or like manufacturers.

Furthermore, the status indicators are usually time multiplexed to reduce power consumption and the overall number of connections between the copier control computer 10 and the control panel 12. This precludes simple monitoring of a voltage drop across a status device and requires the latching of the data at the time that a status device may be switched on.

Figure 6:
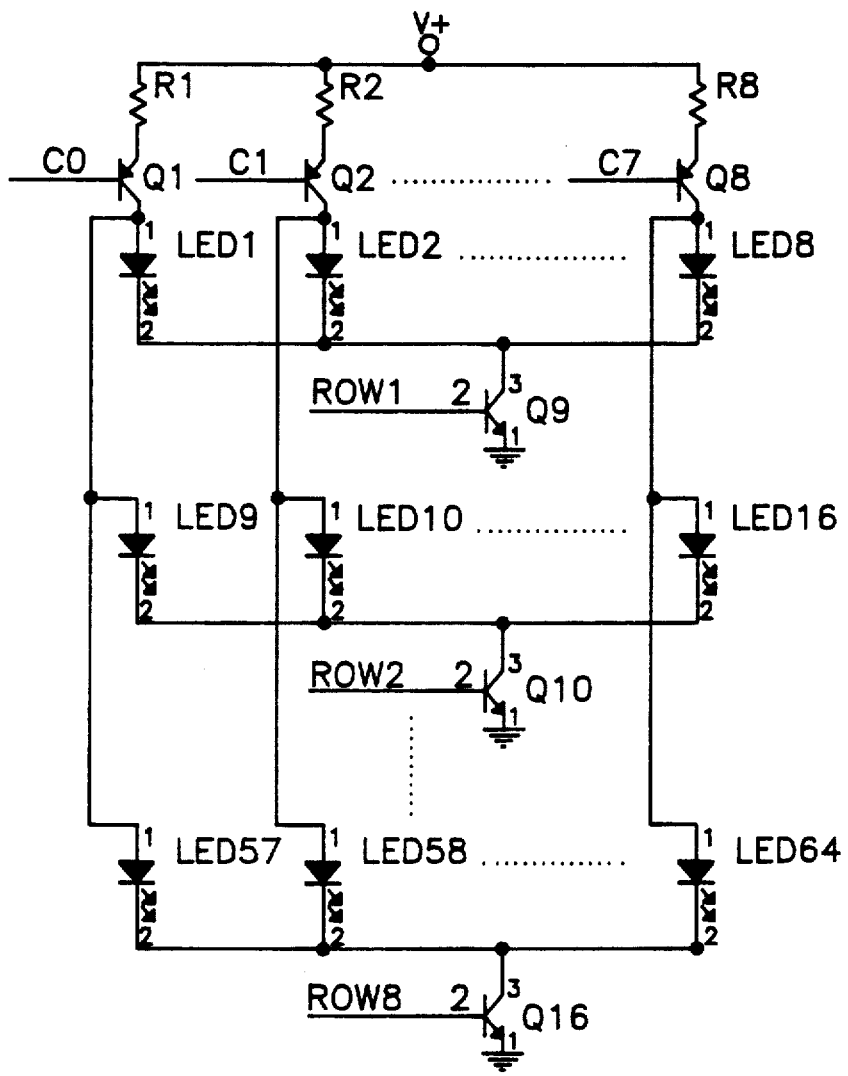
FIG. 6 is a schematic diagram of multiplexed indicators and data tap scheme for use with the present system.

An example, of a multiplexed display system can be seen in FIG. 6. Twenty-four (24) LED's LED-1-LED24, are organized into a three row by eight column matrix. As demonstrated in the multiplexer timing diagram, each row of eight LED's is selected through a common switching transistor, Q9-Q11 respectively, by applying a drive pulse to the base, terminal two of the device. The individual LED's within a common row are selected in parallel by applying a drive signal to the base of the column driver transistor Q1-Q8 respectively. In order to turn on LED10, it is necessary to apply drive signals to Q2 at the time Q10 is driven [C1×ROW 1] at time T2. To capture the data column pattern for each row, it will be necessary that the C0-C7 and ROW0-ROW2 signals pass through from the data tap 8 to the translator 6 for processing.

To extract the copier status information that is displayed on the control panel 12 a data tap 8 will be installed within the copier. The data tap 8 will be placed in line with the control panel data cable 18 either on the copier control computer board 10 as shown in FIG. 4 or between the copier control computer 10 and the control panel 12 on the control panel data cable 18 as shown in FIGS. 2 and 3. The main purpose of the data tap 8 is to provide a physical interface means to the translator 6 for a variety of copiers. The main purpose of the translator 6 is to transform the various signals of the various copier machines 2 into uniform signals to be read by the data collection computer 16 as well as to demultiplex the copier status information that is scanned from the copier control computer 10 and return this data to the central data collection point 4 when it is polled to do so. These functions are accomplished by either a single microcomputer based system or two separate microcomputer based systems depending on the configuration of the monitoring network.

When a monitoring network is relatively small in size or does not have a high demand to be polled in a real time fashion then a "passive" data tap 8 in conjunction with a single CPU based translator 6 will be used as shown in FIGS. 2 and 3.

Figure 5A:
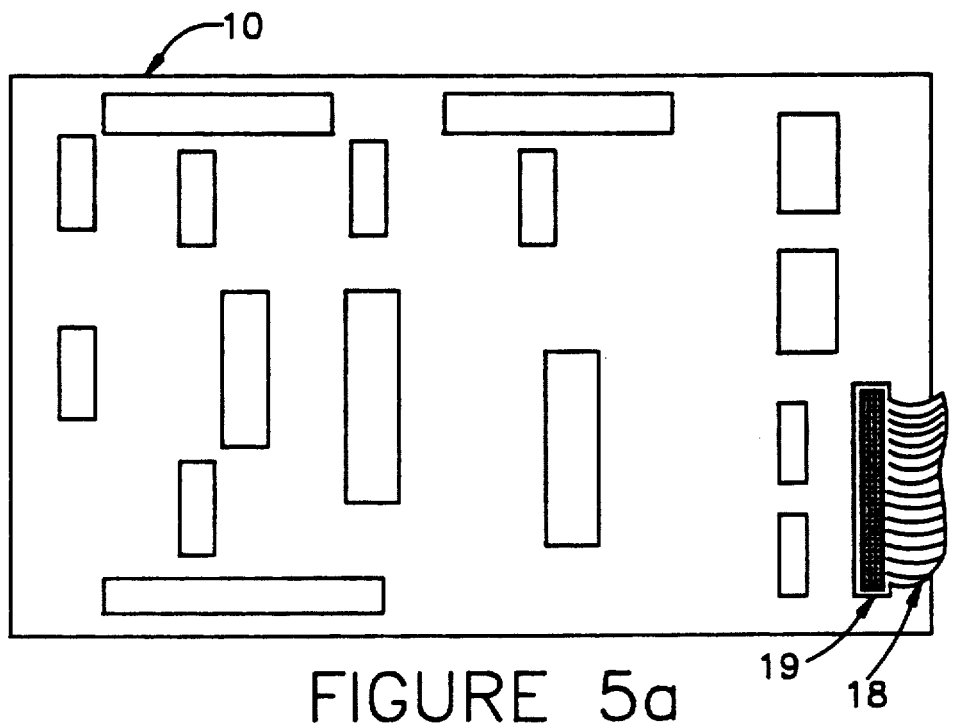
FIG. 5A is a schematic top plan view of the copier control computer board including control panel data cable connection.
Figure 5B:
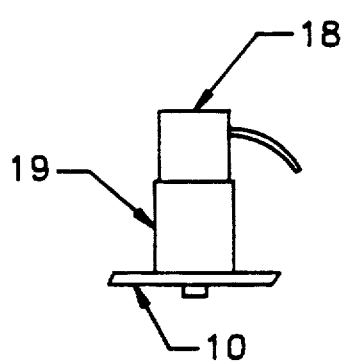
FIG. 5B is a side plan view of the original control panel data cable connection.
Figure 5C:
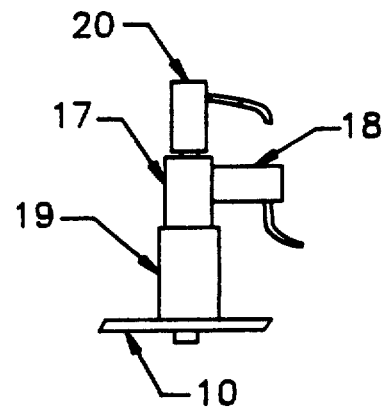
FIG. 5C is a side plan view of the control panel data cable connection including a passive data tap for use with the present invention.
Figure 5D:
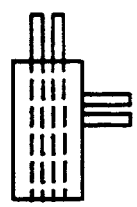
FIG. 5D is a side plan view of the Y-tap header used for parallel connection of the translator data cable with the control panel data cable.
Figure 5E:
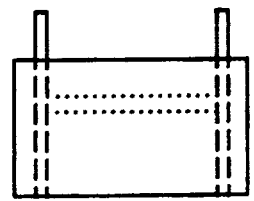
FIG. 5E is a front plan view of the Y-tap header used for parallel connection of the translator data cable with the control panel data cable.

The data tap 8 is located inside of the copier 2 and must not violate any FCC regulation. As a result, the data tap 8 in its simplest form is a passive device that merely passes the status information that passes from the copier control computer 10 to the control panel 12 to the translator 6, i.e., by a Y-tap header, Y-cable or buffer/driver device. A simple Y-tap for use with a Xerox 1025 copier, having its control panel data cable 18 connected to the copier control computer 10 shown in FIGS. 5A and 5B through a 34-position pin header 19, comprises an extended 34-position pin header 19 (3-MESP Series). The Y-tap header 17, having a physical male electrical connection that is 90 degrees to the straight through, shown in FIG. 5D and 5E, replaces the original control panel data cable 18 connection to the copier control computer board 10 and allows the translator data cable 20 to be connected in parallel with the control panel data cable 18, see FIG. 5C.

Figure 7:
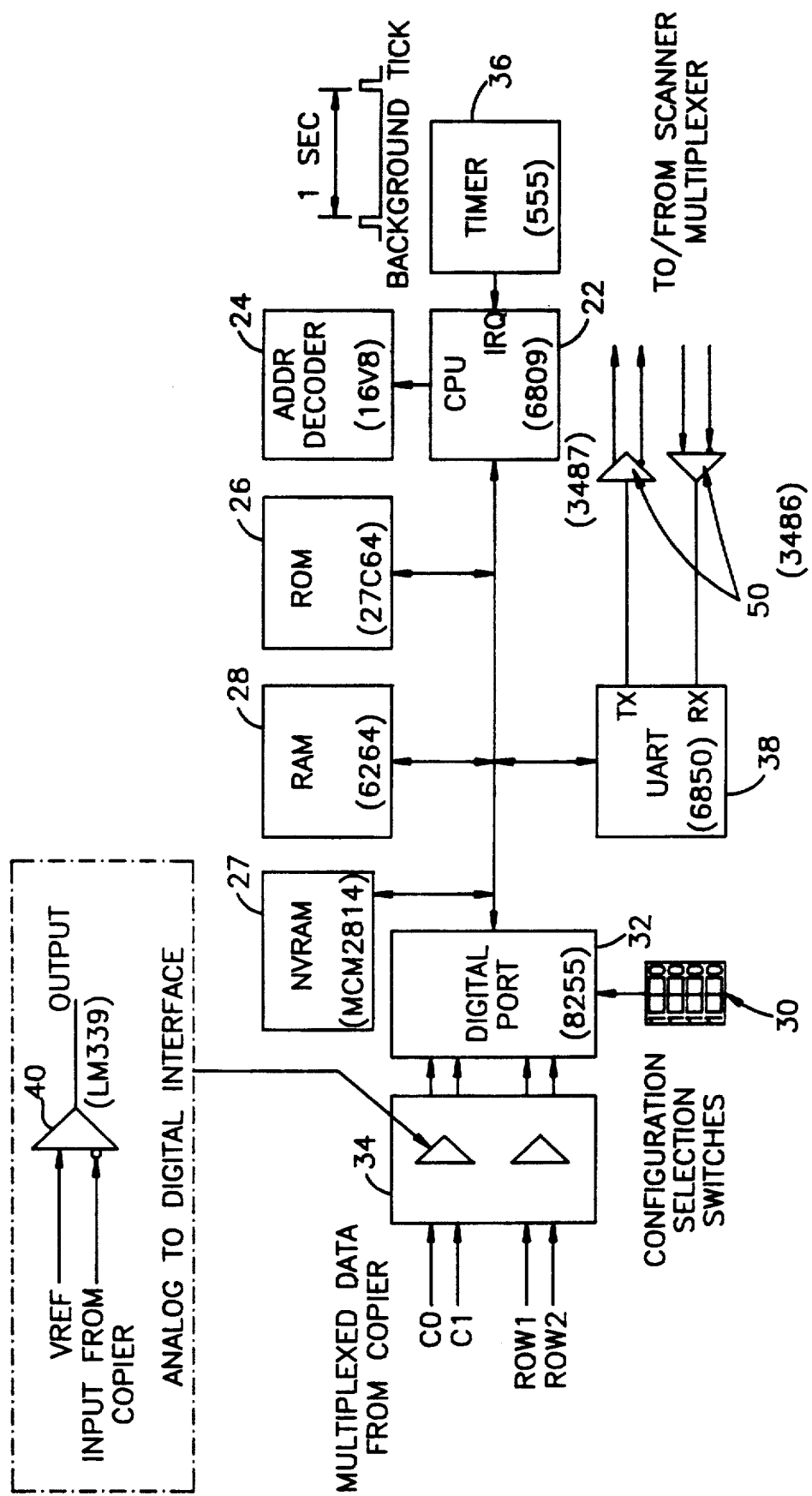
FIG. 7 is a schematic block diagram of a multiplexed data version translator for use with the present invention.
Figure 8:
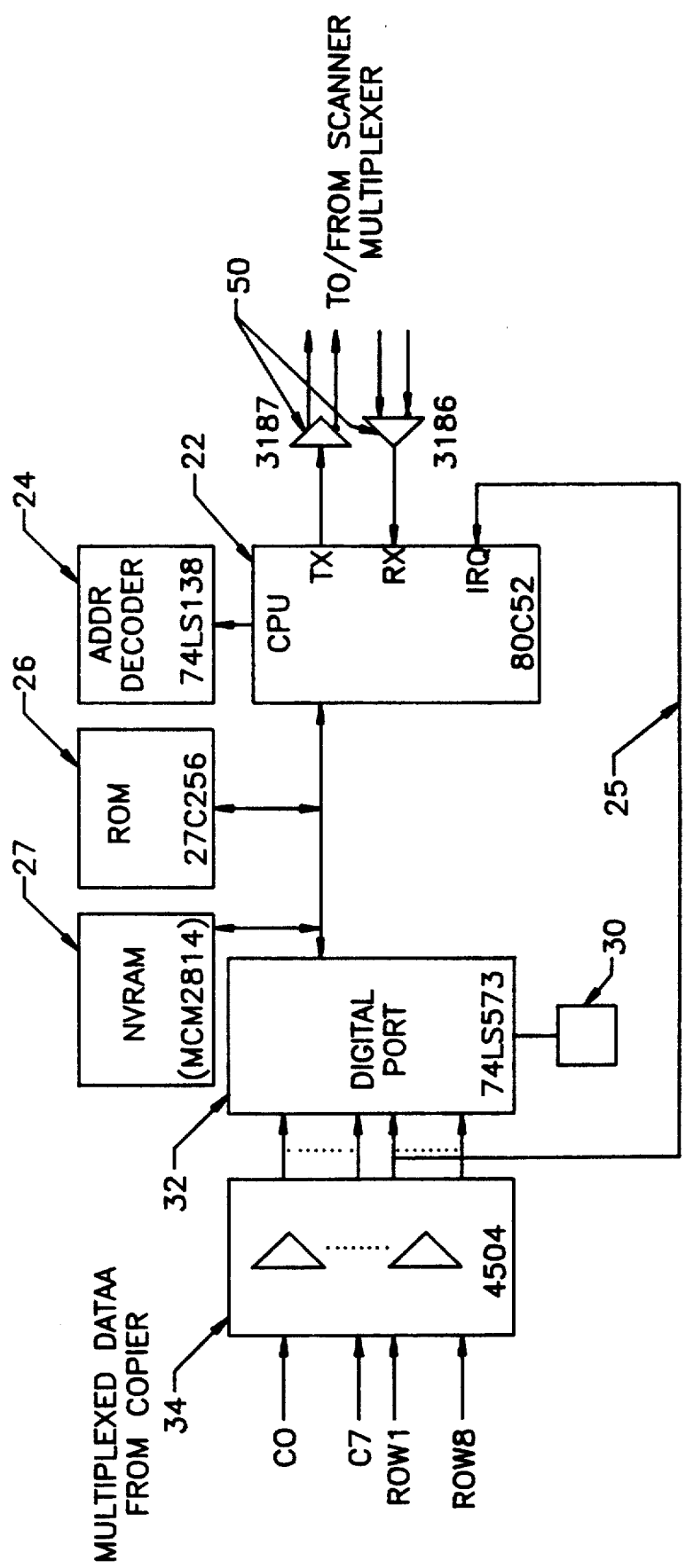
FIG. 8 is a schematic block diagram of a multiplexed data version translator with the random access memory, timer and universal asynchronous receiver/transmitter intergrated into the central processing unit.

The single CPU based translator system for a static multiplexed data interface is displayed in FIG. 7 and 8. It is microprocessor based using standard off-the-self components as well as basic design techniques. A 6809 microprocessor chip is the central processing unit 22 (CPU) along with a programmable address decoder 24 (16V8) used to select the support devices (i.e., RAM, ROM etc.) that are address mapped to the CPU 22.

The stored program for the CPU 22 can be found in the read only memory 26 (ROM, 27C64 or 27C256). The CPU stack information and temporary variables are located in random access memory 28 (RAM, 6264).

The single CPU based translator 6 is also comprised of nonvolatile random access memory 27 (NVRAM, MCM 2814), configuration selection switches 30, a digital port 32 (8255), analog to digital interfaces 34 (LM339), a timer 36 (555) and a universal asynchronous receiver/transmitter 38 (UART, 6850). If an 80C52 microcomprocessor chip is used as the central processing unit 22 the functions of the random access memory timer and the universal asynchronous receiver/transmitter are incorporated in the one chip as shown in FIG. 8.

The NVRAM 27 is read as with a conventional RAM but it retains the stored data if power is removed. This device is also known as an Electrically Erasable Programmable Read Only Memory (EEPROM) and/or a Battery Backed RAM (BBRAM) which contains its own on-board battery and change-over circuitry. Special information patterns, such as identifying signatures are loaded into the NVRAM 27. This can be done at manufacturing time or remotely through the data collection computer 16. This information can then be used to remotely identify the copier within the network, e.g. as a header attached to the data returned to the central data collection point 4.

This enables a network with many copiers to have fewer problems relating a specific copier to its database records. For, example, if a copier is moved from one location to another in the network, the signature identification would travel with it. As a result the copier still could be recognized by the data collection computer 16 database manager even though the copier is now at a different location in the network. A less obvious advantage to the identifying signature is the ability to identify a copier that has been stolen, stripped of all of its serial labels and then sold. Because this component is a seemingly permanent internal component there is a high probability that it would remain intact internal to the copier and would provide a means of identification.

The set of configuration selection switches 30 enables the translator 6 to take on different functional characteristics based on the setting of the switches 30. The output of the switches 30 are read by the CPU 22 through a digital port 32. This device consists of three 8-bit parallel ports that are configured as to allow the CPU 22 to read in the digital level signals from the digital port 32. The state of the switches 30 are read in at power-up time by the CPU 22 to set up certain operating characteristics of the translator 6.

Some examples of this would be to map stored error codes in ROM 26 to different data input line combinations for specific copiers. Switch settings into other inputs of the digital port 32 configure other operating parameters of the translator 6 for similar copiers. Minor differences between copiers that could be compensated for might include error messages unique to one or more specific copiers or the size of storage space allocated in RAM 28 for message lengths.

The CPU 22 receives the status data from the digital port 32. However, the data that comes from the data tap 8 to the digital port 32 is multiplexed data and the information may not be at appropriate signal levels for the digital port 32 or may contain undesirable signal noise and, therefore, must be conditioned to digital levels through an analog to digital interface 34. This interface 34 consists of a voltage comparator 40 such as a LM339 or like component, which has two inputs, the signal to be conditioned from the copier 2 and a threshold reference voltage (VREF) see FIG. 7.

The output of the comparator 40, OV for a logical "0" state or +5 V for a logical "1" state, will reflect the differential relation of the voltage input from the copier 2 and VREF. That is to say, if the input is greater than the reference the output will be OV and visa versa.

Now that the input signal has been conditioned to the correct signal levels for the digital port 32, the signal can be read by the CPU 22 through the lines of the digial port 32. This information is then transferred to the RAM 28 for later evaluation, based on the characteristics from the configuration switches 30.

The status information of the copier changes at a relatively slow pace compared to the computational speed of a microprocessor based system. Therefore, it is only necessary for the translator 6 to periodically evaluate the condition of the copier 2. To accomplish this periodic acquisition technique, a method known as "interrupt driven" is used.

Normally, the CPU 22 is executing its program waiting in an idle loop. A signal into the interrupt request (IRQ) input of the CPU 22, which causes the CPU 22 to execute an algorithm to input and store the data present from the eight row by eight column matrix, can be caused by a background timer 36 as shown in FIG. 7 that produces a signal at some interval or by a wire 25 as shown in FIG. 8 which connects the output port that represents ROW1 of the matrix of the analog to digital interface 34 to the IRQ of the CPU 22 which triggers the CPU 22 when data is present. After the CPU 22 is activated, the row LED is enabled and the column LEDs are stable, the data is stored and the next row of data is displayed. Later the CPU 22 can further evaluate the information to determine what status conditions exist.

The algorithm for such a scan might conceptually look as follows after the background timer 36 has pulsed the IRQ input or the output port that represents ROW1 of the matrix of the analog to digital interface 34 goes high (all signal references are from FIG. 6, multiplexer time diagram):

1. The CPU 22 polls the digital port input mapped to ROW1 and waits for it to be asserted at T1.
2. At that time it is known that the data on C0–C7 is valid and they are stored in a known location in RAM 28.
3. The CPU 22 now repeats steps 1 and 2, instead polling for ROW2 through ROW8 to be asserted at T2 through T8, respectively.
4. Once all of the information has been acquired, the stored images are shifted and compared against test tables that are stored in the ROM 26. The outcome of the tests are stored in RAM 28 for later use.
5. The CPU 22 then returns to its wait loop for the next timer interrupt.

The CPU 22 may also receive an interrupt request signal from the UART 38. The UART 38 enables the CPU 22 to communicate with the scanner/multiplexer 14. The UART 38 performs the task of converting the serial data that is transmitted from the scanner 14 into 8-bit bytes that the CPU 22 can process. It also converts the 8-bit bytes of data from the CPU 22 into a serial stream to be sent back to the scanner 14 along line 52. Furthermore, the transmit (TX) and receive (RX) signal lines are converted to/from standard RS-422 line drivers/receivers 50 for transmission of data over long distances with high immunity from external noise sources. Various transmission media, such as fiber optics, telephone lines, etc., are also possible.

When a service request command from the central data collection point 4 is received by the translator 6, the CPU 22 executes an algorithm to retrieve the most recent condition evaluation in RAM 28. The report could be as simple as an encoded token that represents the meaning of the most recent evaluation. This token would then be decoded into the status text string by the scanner 14 or the user computer 16. Alternatively, the transmitted data could be the literal text string of the status message as it would be shown on the copier control panel 12.

In a large monitoring network there is a chance that a single CPU based translator 6 can become overloaded and degrade system performance. To compensate for this the functions of the data tap 8 and translator 6 are embodied into two separate microcomputer systems, an "active" data tap 3 and buffer node computer 5 which communicate by fiber optic cables, shown in FIG. 9.

The "active" or "smart" data tap 3 is located within the copier 2. It provides a physical interface to the copier 2 and has its own microcomputer to demultiplex the control panel information. The buffer node computer 5 is located outside the copier 2 and is responsible for communication between the smart data tap 3 and the central data collection point 4. This division allows the smart data tap 3 to dedicate nearly all of its resources to monitoring the multiplexed data captured while the buffer node computer 5 can honor poll requests from the central data collection point 4. Only when a poll is received from the buffer node computer 5 does the smart data tap 3 discontinue its data monitoring operation and up-load its data to the buffer node computer 5 for return to the central data collection point 4. Together the smart data tap 3 and the buffer node computer 5 perform the same functions in the same manner as the single CPU translator 6.

Figure 11:
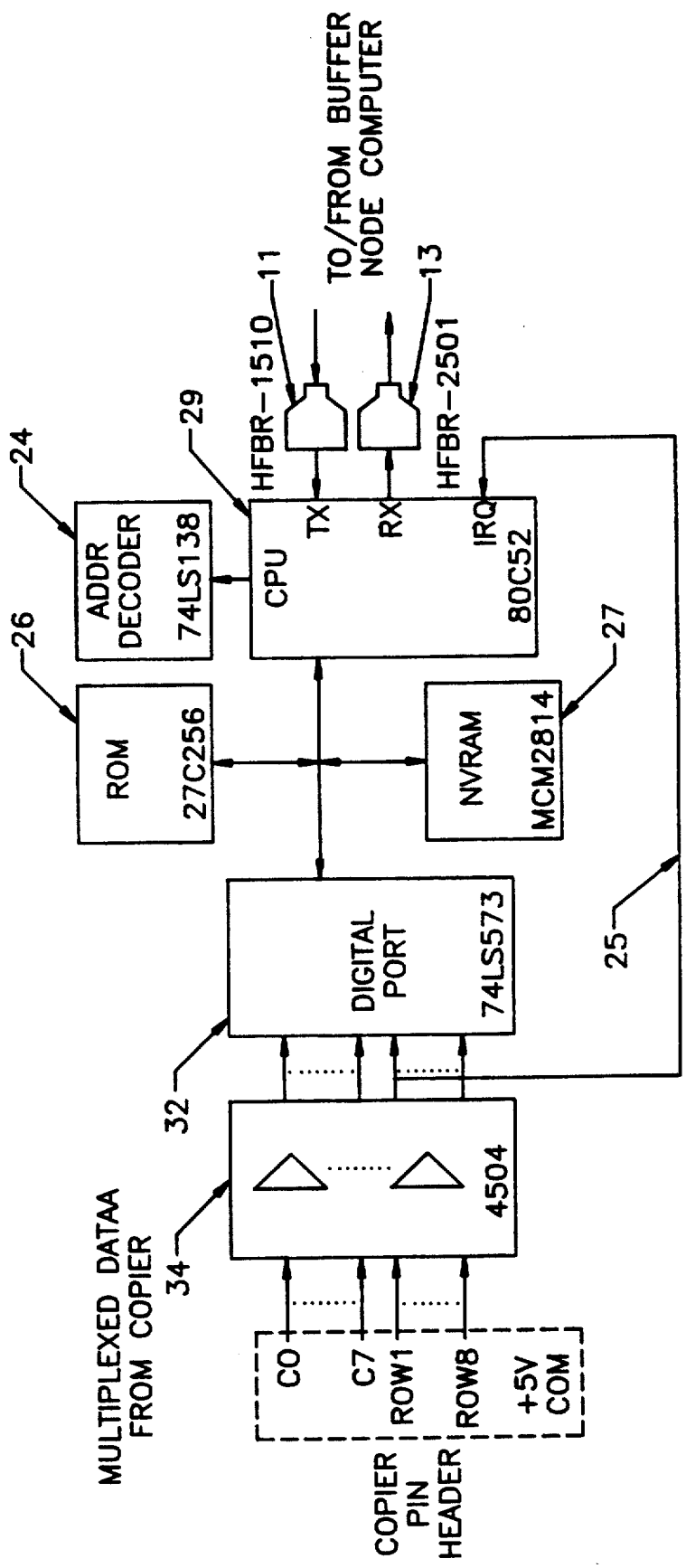
FIG. 11 is a schematic block diagram of a multiplexed data version active data tap component of the translator.

The smart data tap 3, shown in FIG. 11, is microprocessor based using standard off-the-shelf components as well as basic design techniques. Its components are similar to those described earlier in single CPU based translator design.

The smart data tap 3 is comprised of a central processing unit (CPU) 29 that may have a random access memory (RAM), universal asynchronous receiver/transmitter (UART) and a timer, either incorporated into the CPU29 or as separate components (not shown), as well as a programmable address decoder 24 (74LS138), read only memory 26 (ROM, 27C256), non-volatile random access memory 27 (MCM2814), digital port 32 (74LS573), analog to digital voltage equalizer 34 (4504) and fiber optic transmitter and receiver connectors 11 and 13 (HFBR-1510 and HFBR-2501 respectively).

Figure 10A:
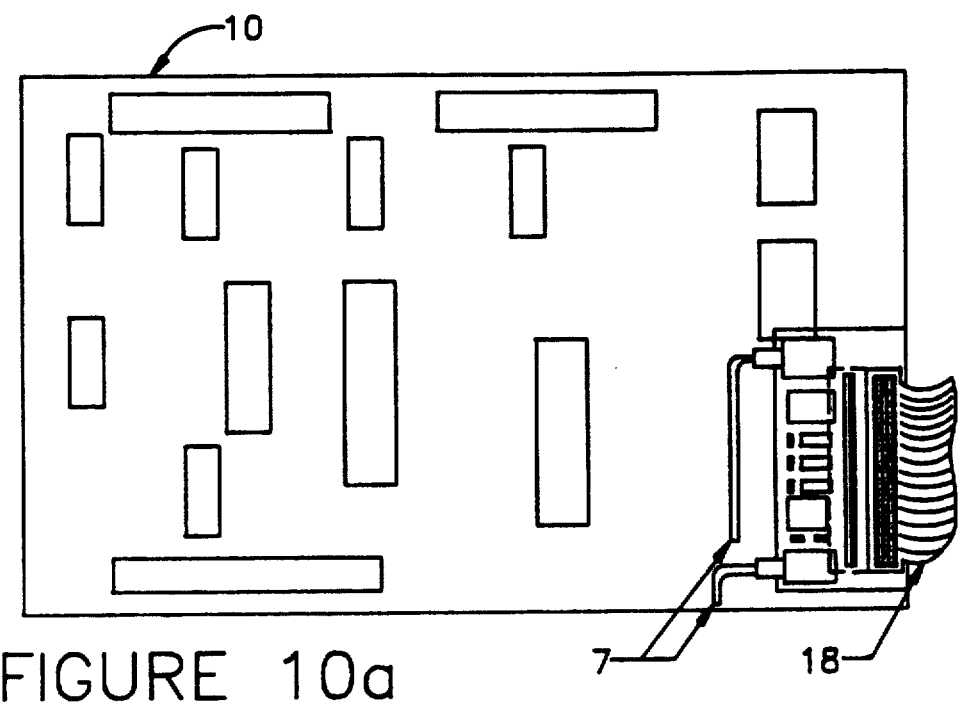
FIG. 10A is a schematic top plan view of the copier control computer board including copier control panel data cable connection with active data tap.
Figure 10B:
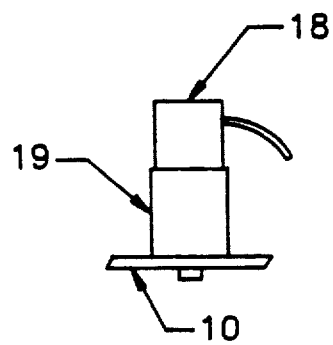
FIG. 10B is a side plan view of the original control panel data cable connection.
Figure 10C:
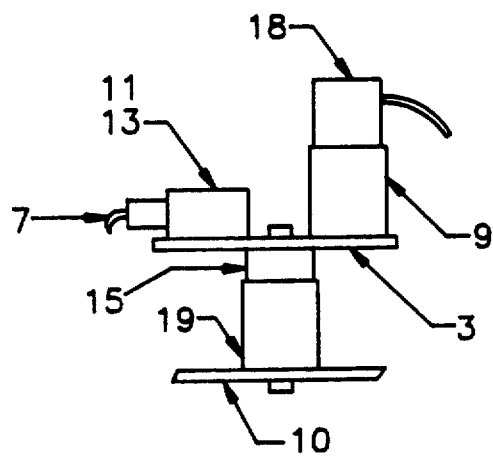
FIG. 10C is a side plan view of the control panel data cable connection including an active data tap for use with the present invention.
Figure 10D:
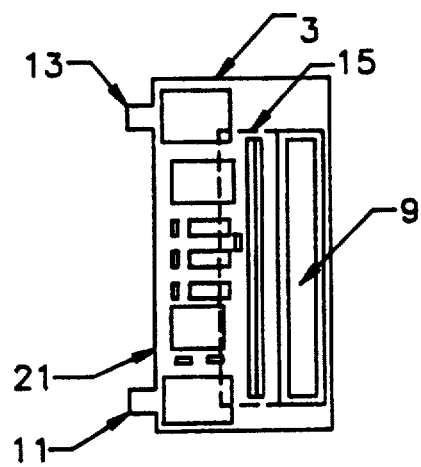
FIG. 10D is a top plan view of the control panel data cable connection including an active data tap for use with the present invention.

The smart data tap 3 is installed directly onto the copier control computer board 10 as shown in FIGS. 10A and 10C. The control panel data cable 18 is removed from its original position pinheader 19 of the copier control computer board 10, shown in FIG. 10B. In its place is inserted the smart data tap 3 by means of a mating header 15 that is part of the printed circuit board assembly. The rest of the smart tap microcomputer, shown in FIG. 10D consists of the actual computing elements packaged as surface mounted devices (SMD) 21, the front panel connector 19 and the fiber optic transmitter 11 and receiver 13 pair.

Figure 12:
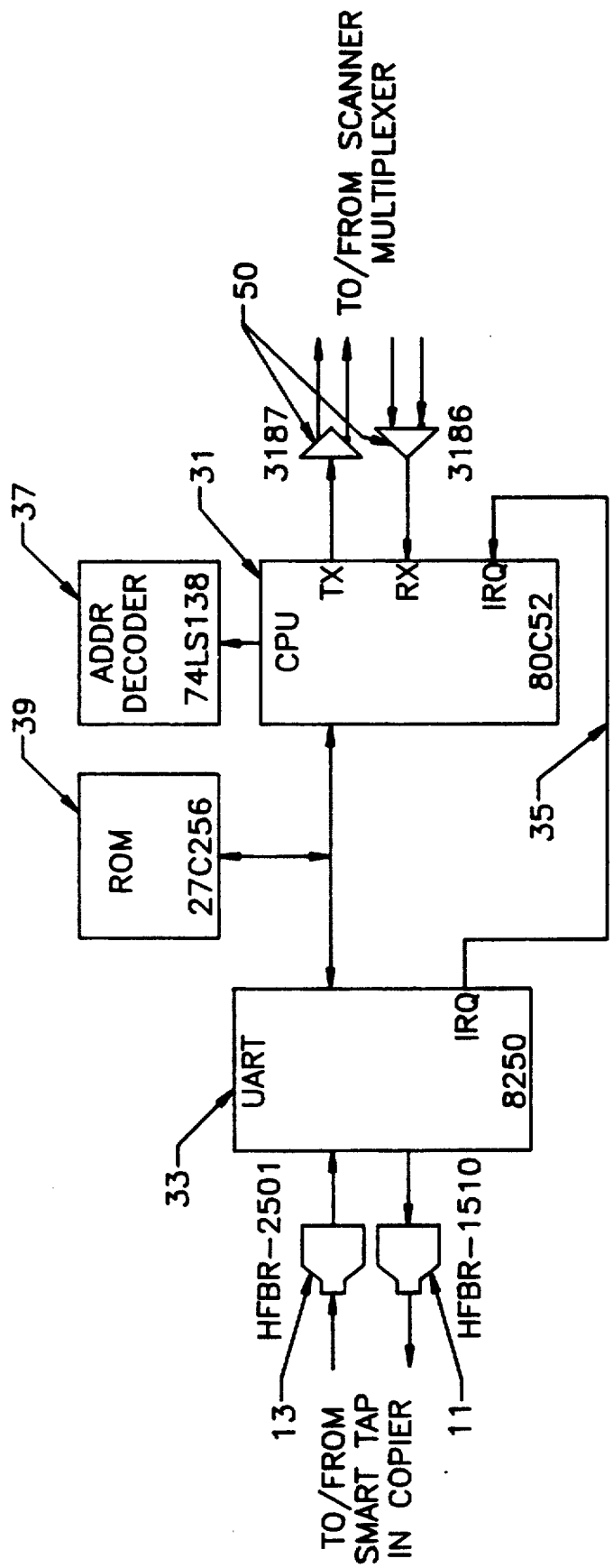
FIG. 12 is a schematic block diagram of a buffer node computer component of the translator.

The buffer node computer 5 as shown in FIG. 12 is also microprocessor based using standard off the shelf components. It is comprised of a central processing unit 31 (CPU,80C52) that again may have random access memory (RAM), universal asynchronous receiver/transmitter (UART) and a timer either incorporated into the chip or as separate components (not shown). Also included in the buffer node computer 5 are a programmable address decoder 37 (74LS138), read only memory 39 (ROM,27C256), a universal asynchronous receiver/transmitter 33 (UART,8250), fiber optic transmit and receiver connectors 11 and 13 (HFBR-1510, HFBR-2501) and RS-422 line drivers/receivers 50 (3487,3486).

The smart data tap 3 and buffer node computer 5 functionality is basically the same as described earlier in said single CPU based translator. The smart data tap CPU 29 continuously executes the stored instructions in ROM 26 to demultiplex the copier control information. This information is then stored in RAM until a poll is received from the buffer node computer 5. The buffer node computer 5 sits idle waiting for a service request from the central data point 4. When the buffer node computer 5 receives a poll from the central data point 4 the CPU 31 executes an algorithm to retrieve the copier status data from the smart data tap 3.

When the smart data tap CPU 29 receives the poll on its receive port an algorithm is executed to retrieve the copier status data from RAM. The UART located in the CPU 29 converts the 8-bit bytes into serial data to be transmitted over the fiber optic cable 21. When the data reaches the buffer node computer 5 the information is again converted back into 8 bit bytes by the UART 33. When the data is ready to be passed onto the buffer node computer CPU 31 the UART 33 sends an interrupt request signal along line 35 to the CPU 31 to activate an algorithm to retrieve the data, convert the data to serial format and then pass this data to the scanner 14 through the RS-422 line drivers/receivers 50.

Figure 19:
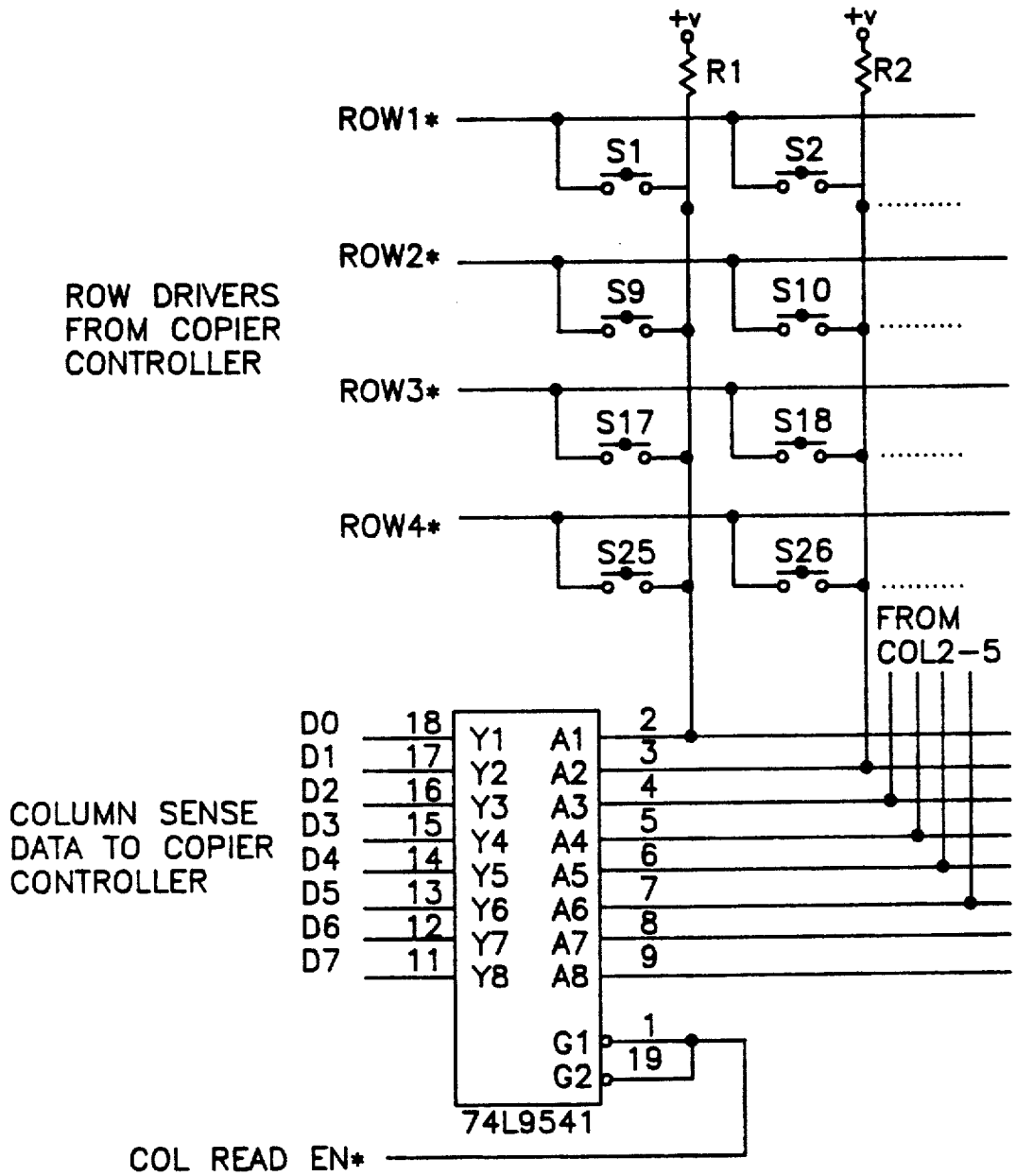
FIG. 19 is a schematic diagram of a copier multiplexed keyboard with remote keystroke monitoring and remote keystroke operation capabilities.
Figure 19:
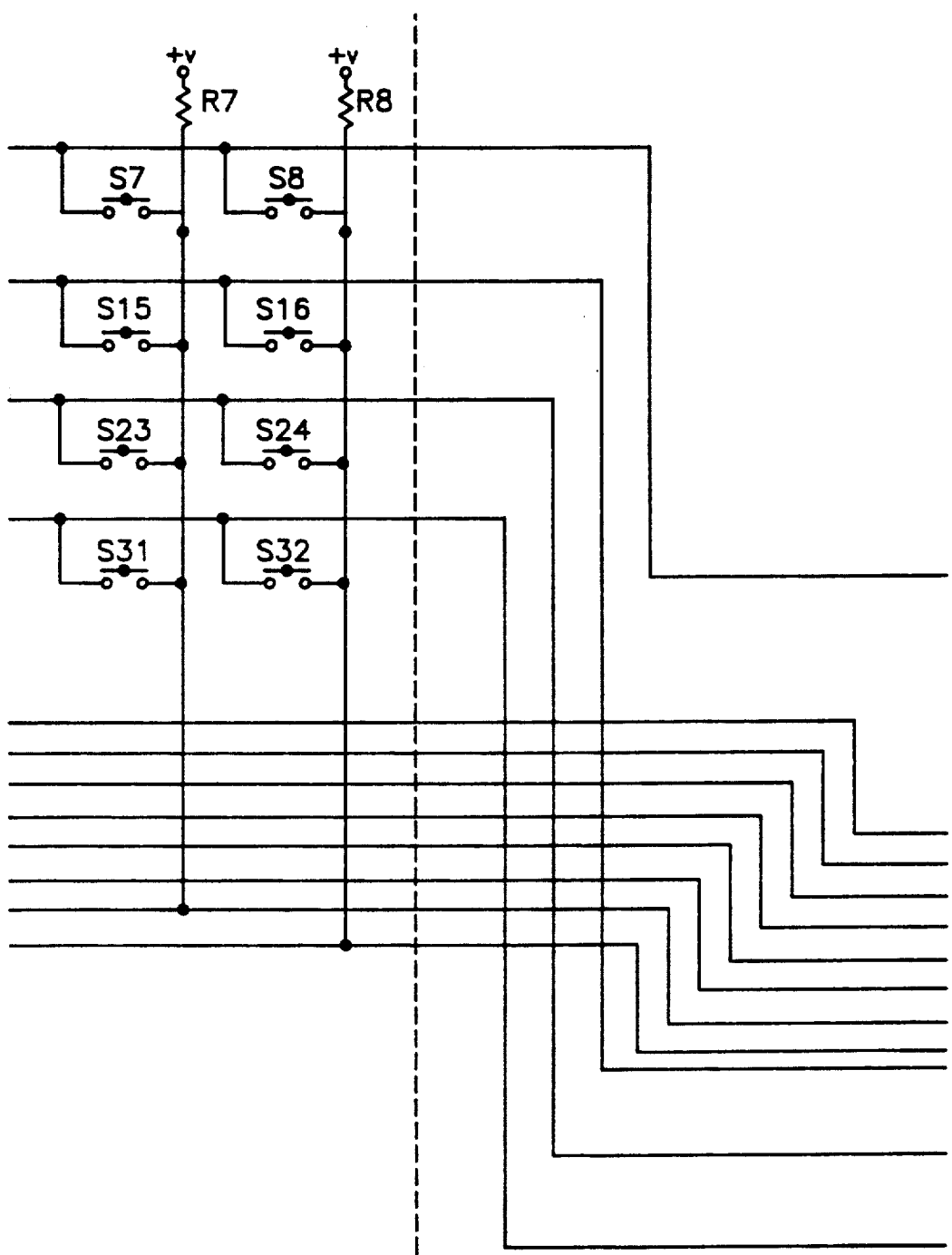
Figure 19:
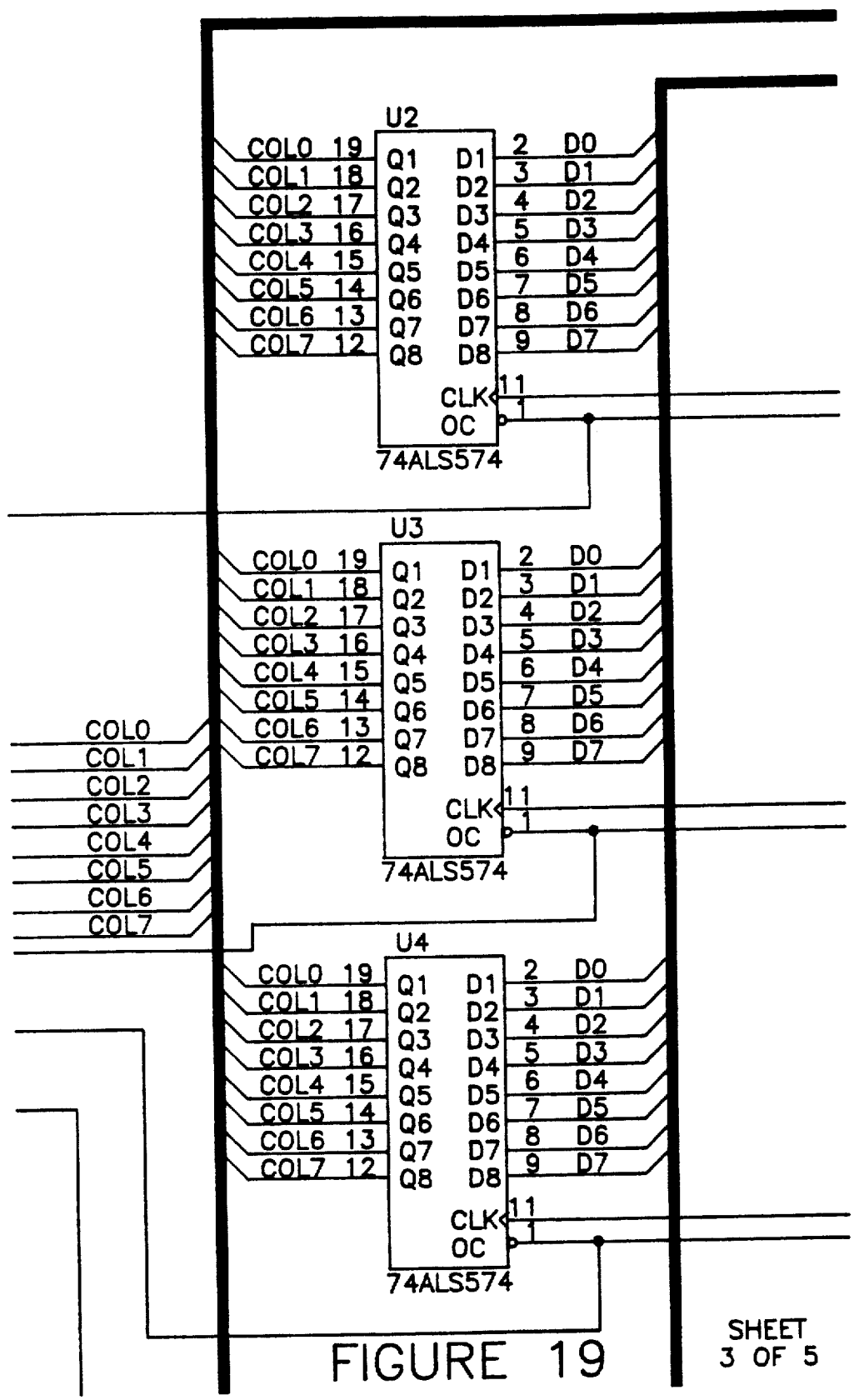
Figure 19:
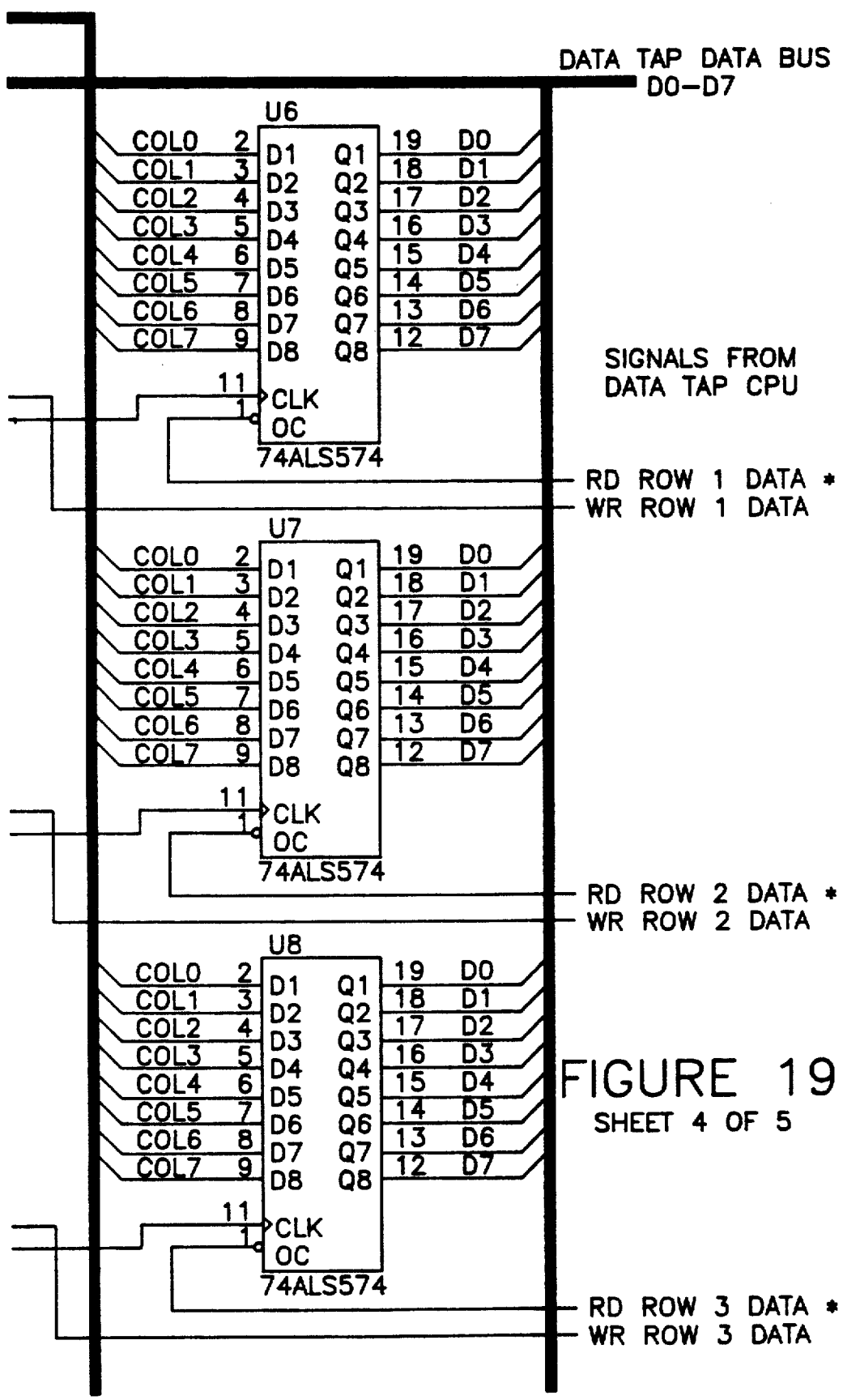
Figure 19:
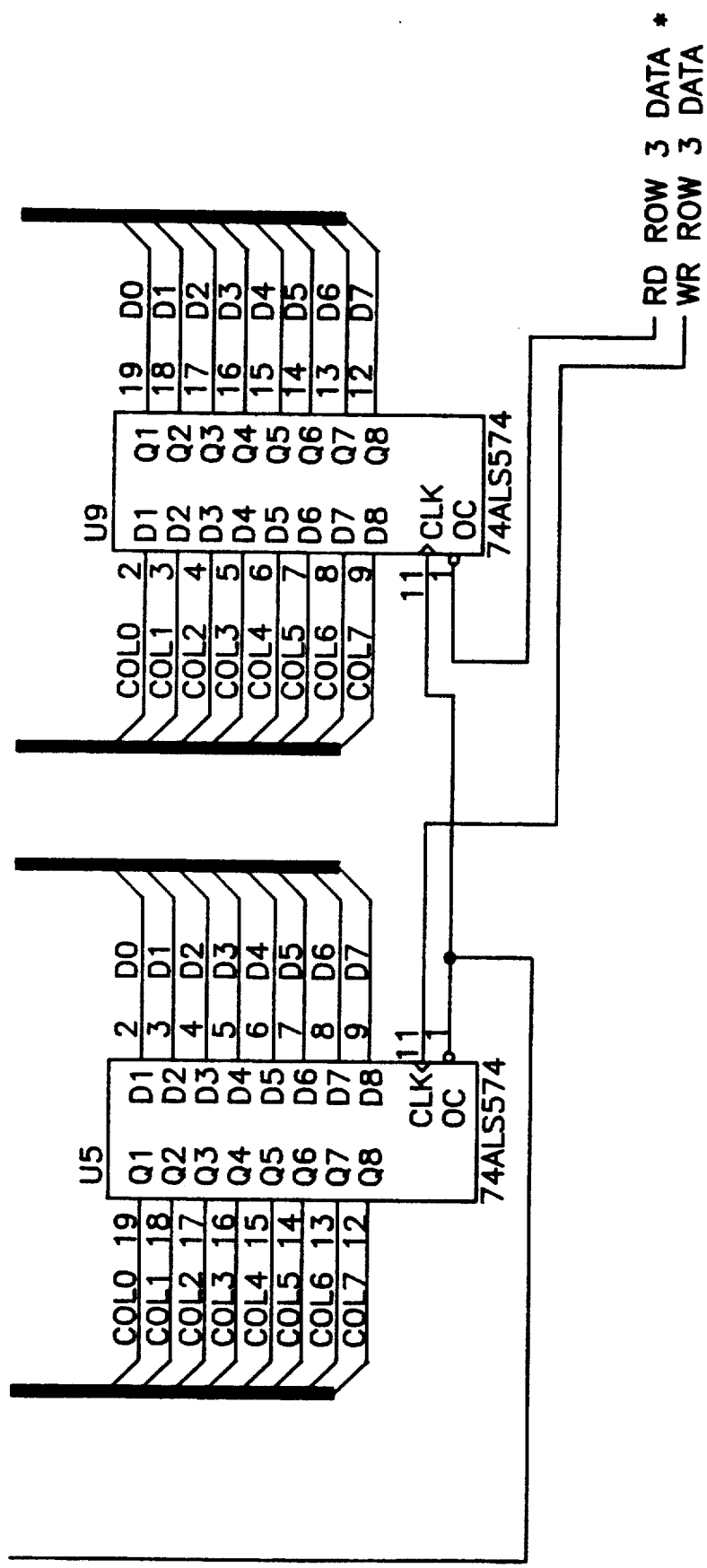

Control panel operator keys are often multiplexed using techniques, shown in FIG. 19, that are similar to those employed with static display indicating devices as shown in FIG. 6. With respect to the translator 6, operator keys can serve as both an status input means, showing the current status of any key(s) down, or as an output means that enables the system user to remotely "strike" a key(s) on the control panel.

The process is shown in FIG. 19. A keyboard S1-S32, is shown organized as a 4×8 matrix. The rows as strobed by signals ROW1*-ROW4* with the returning sense columns COL0-COL7 pulled to a logical by resistors R1-R8, respectively. The resultant column data is read via the copier control to obtain D0 -D7 through the buffer U1 for each occurrence of a row scan signal when the COL READ EN* signal is asserted. An example of this operation is found in the multiplexed timing diagram of FIG. 19A. When an operator presses a key, such as S10 (copier start) at some time T1, and the keyboard matrix ROW2* is asserted at time T3 during a scan cycle, the COL2 sense line will be driven to a logical 0. This corresponds to the data bit D1 when the buffer U1 is read.

Because the keyboard scanning operating may be too brief for the translator 6 to capture, a set of four 8-bit latches, U6-U9 corresponding to each matrix row, are provided to automatically capture the column sense signals As each row is strobed by ROW1*-ROW4*, the sense column data is clocked into its respective latch. In this way, the translator CPU 22 can read each row latch by asserting signals RD ROW 1 DATA*-RD ROW 4 DATA* asynchronous to the actual copier scanning operation to obtain a current image of the switch matrix. This image is then evaluated for copier specific information before being transmitted to the MAC computer 16. In the timing diagram, FIG. 19A, translator 6 reads an $FF (hexadecimal) from the latch U8, between T4 and T5, to obtain the image of switches S17-S24. The image indicates that no keys are currently pressed within row 3.

In addition to reading the keyboard status, the translator 6 provides the system with the capability of remotely asserting the control panel keys exactly as if an operator were pressing the keys. A set of four 8-bit latches, U2-U5 corresponding to each matrix row, are connected together in parallel across the column sense lines COL0-COL7. When a remote key access is desired, the MAC computer 16 transmits a code relating to a specific key over the communication line 52 to the desired translator 6. The translator 6 decodes the command and writes the necessary data pattern into the selected latch. When the row select line is asserted that corresponds to the "programmed latch", the output drivers of the latch are enabled. This drives the column sense lines to the logic level corresponding to the pattern that was written into the latch. The data is then read back by the copier control computer via the column sense buffer U1.

Figure 19A:
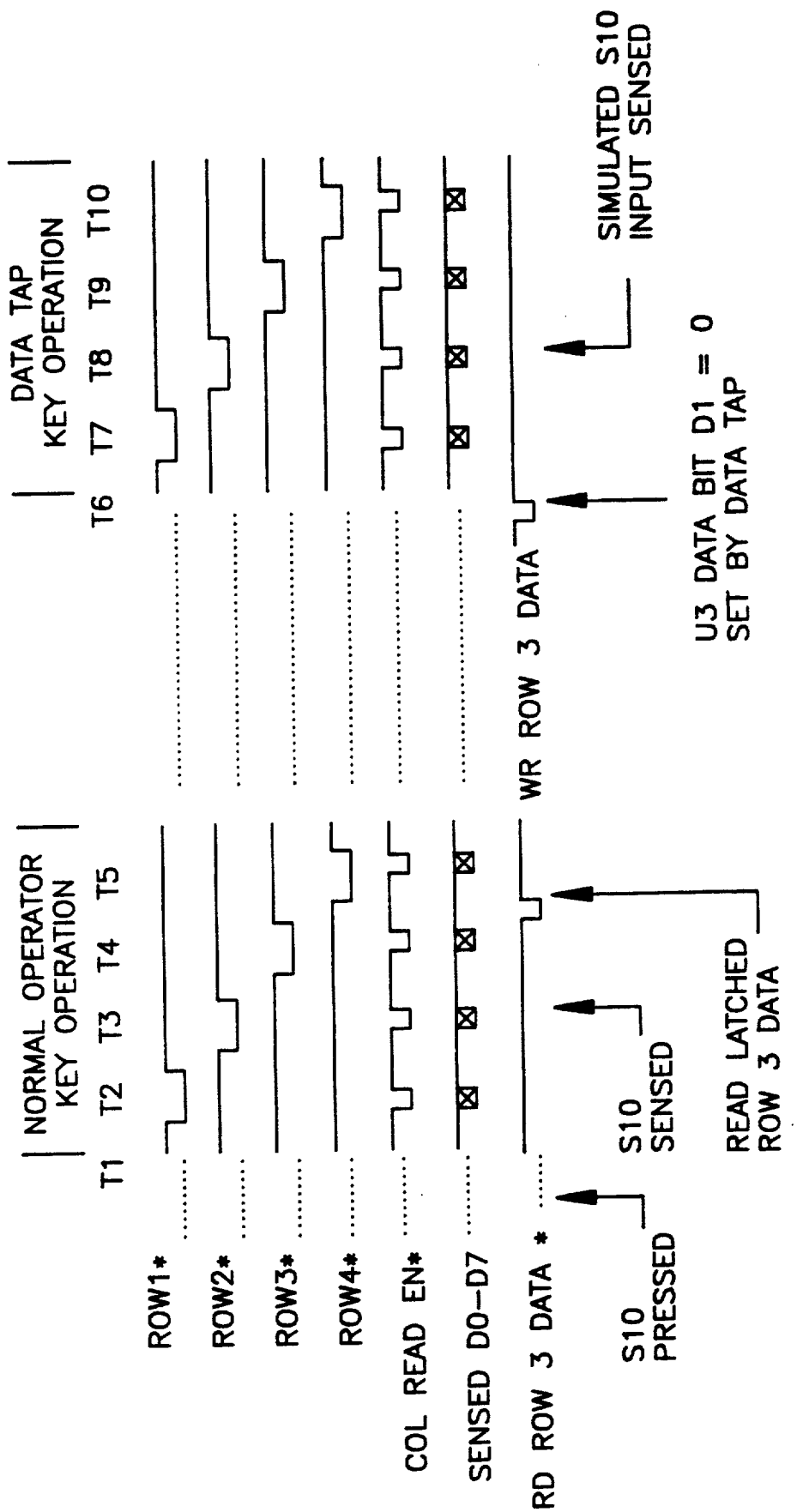
FIG. 19A is a multiplexed keyboard timing diagram.
Figure 20C:
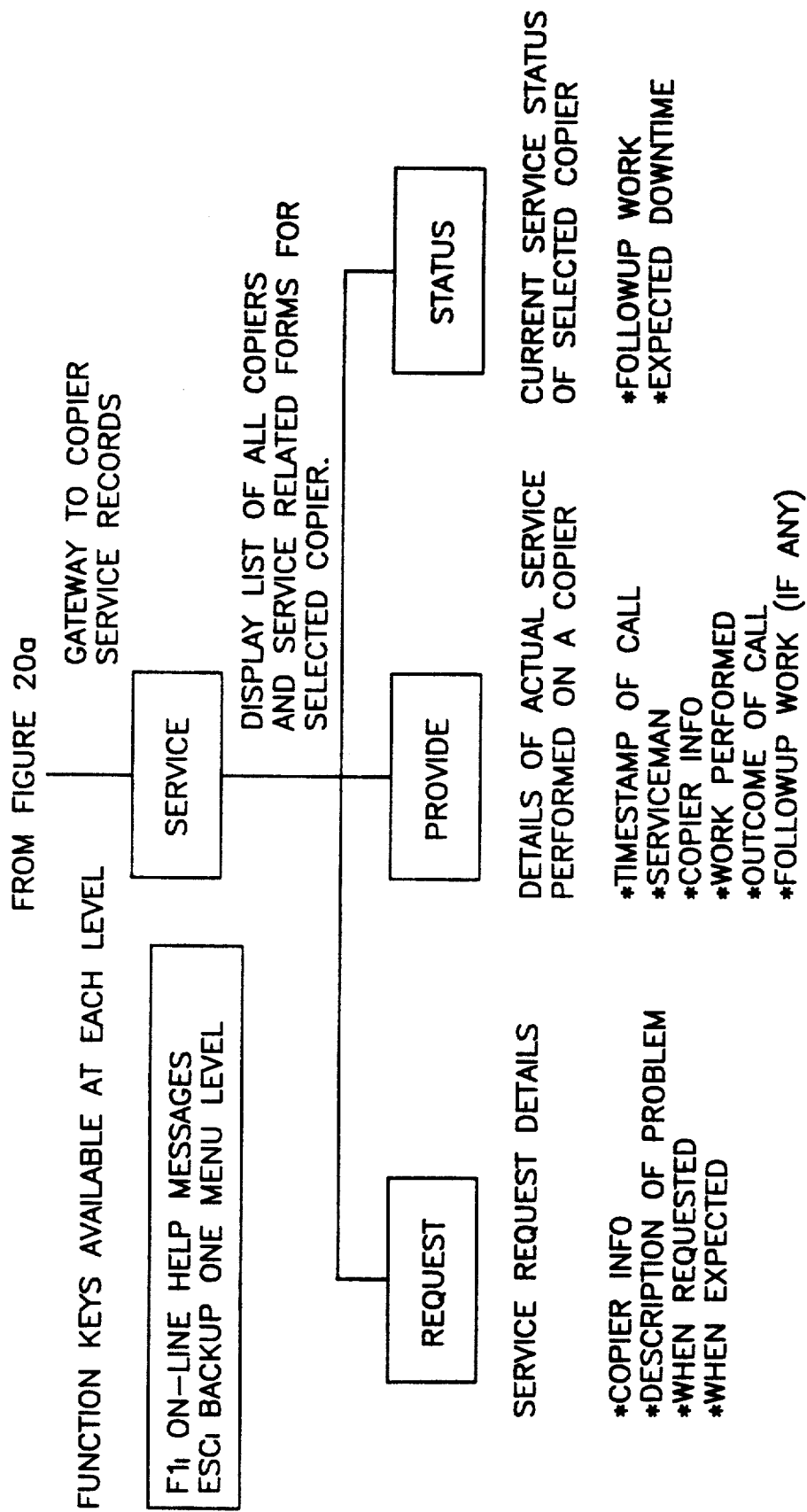
FIG. 20C is an expanded view of the information available from the SERVICE menu selection.
Figure 20D:
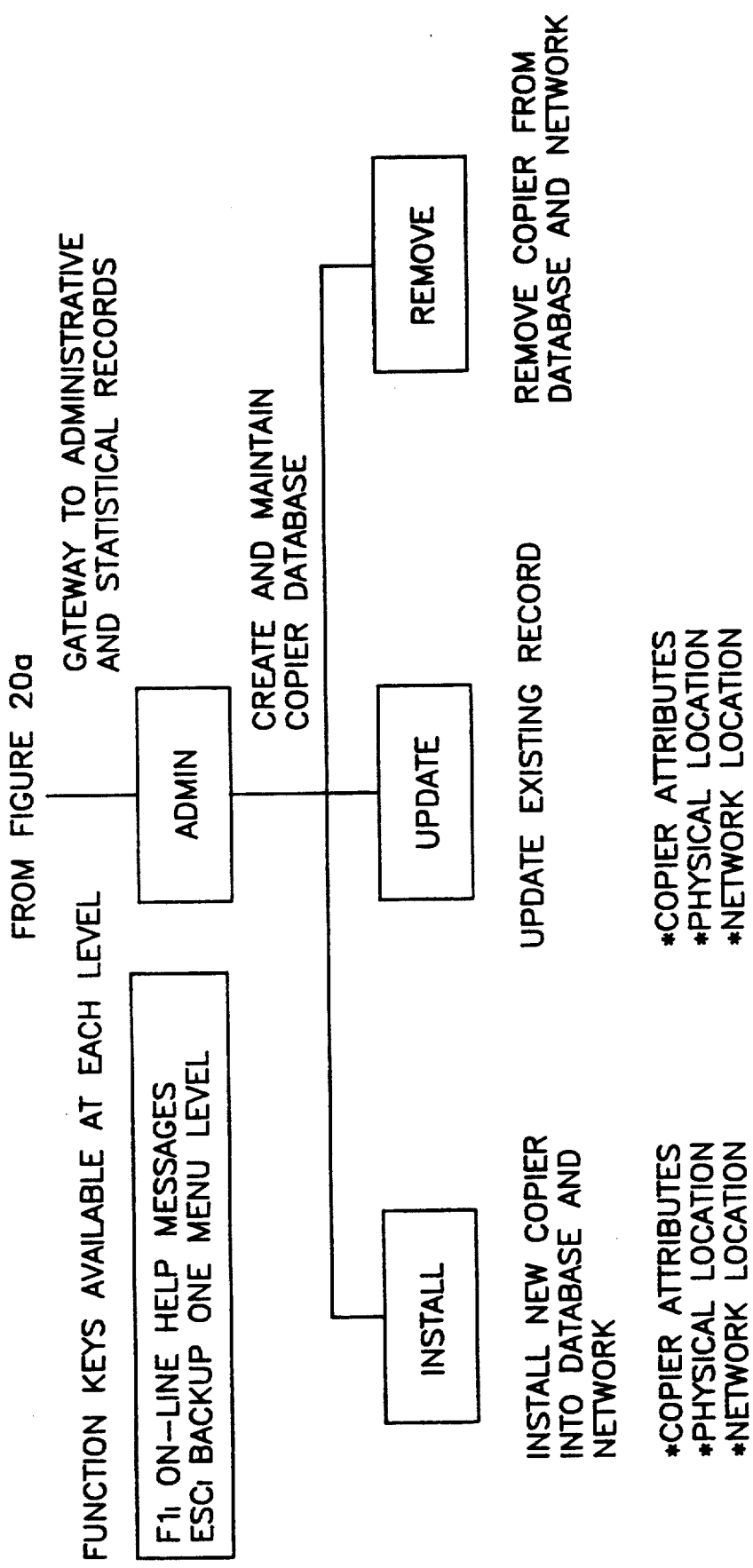
FIG. 20D is an expanded view of the information available from the ADMIN menu selection.
Figure 20E:
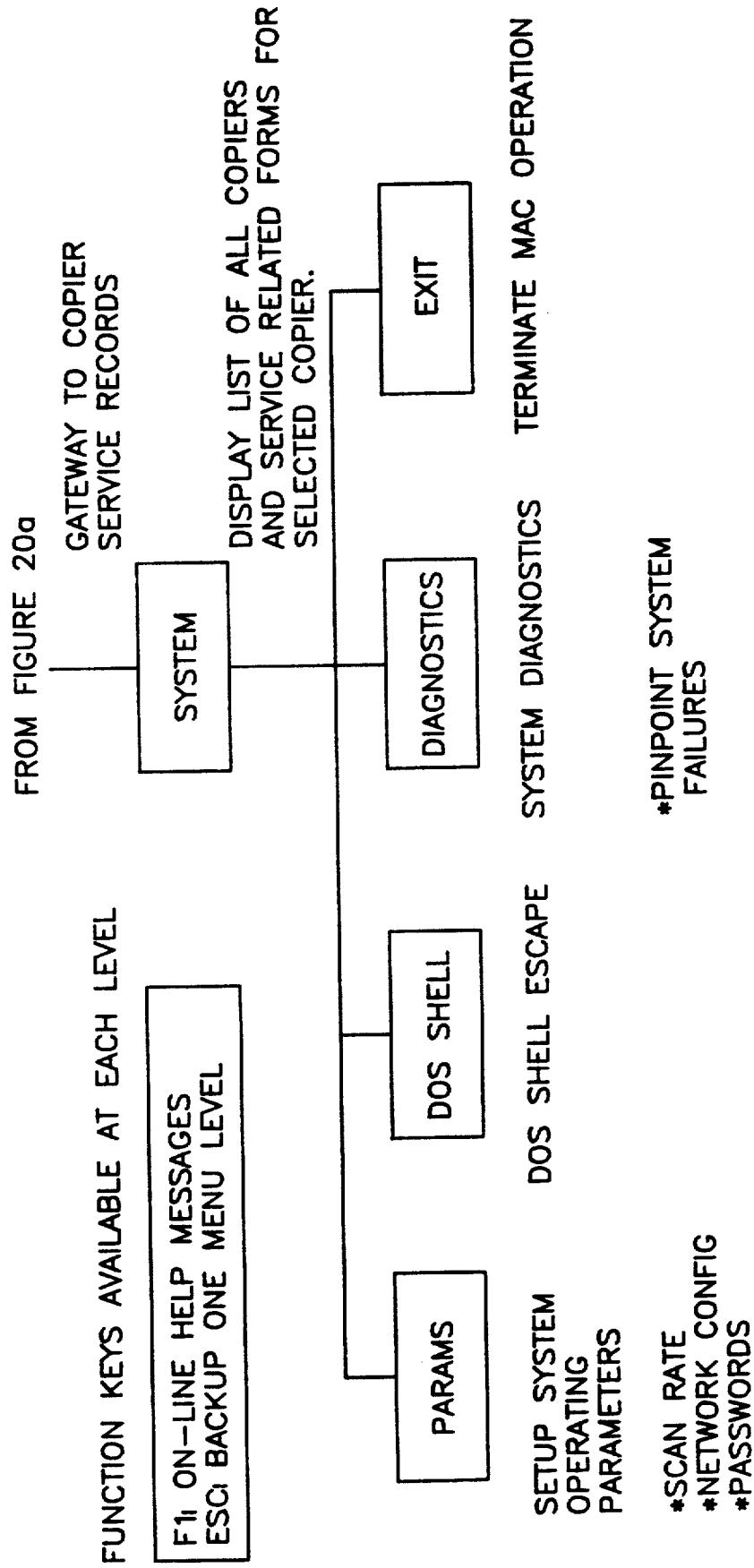
FIG. 20E is an expanded view of the information available from the SYSTEM menu selection.

In the keyboard timing diagram FIG. 19A, an example is shown for the assertion of switch S10. The translator CPU 22 writes a $FD into latch U3. When ROW2* is asserted, COL1 will be driven to a logical 0 which corresponds to switch S10 being pressed. The image that the copier control computer will receive on D1 when U1 is read will appear as if S10 has been pressed by an operator. After a predetermined period of time, the latches U2-U5 are cleared to remove the simulated keystroke.

In the preferred embodiment, the keyboard status monitoring and driving control circuitry is part of the smart tap logic. This is necessary because the circuitry would have to be copier specific in design. The smart tap 3 would receive commands from the MAC computer 16 via the buffer node computer 5, and would return status information in like manner.

Figure 13:
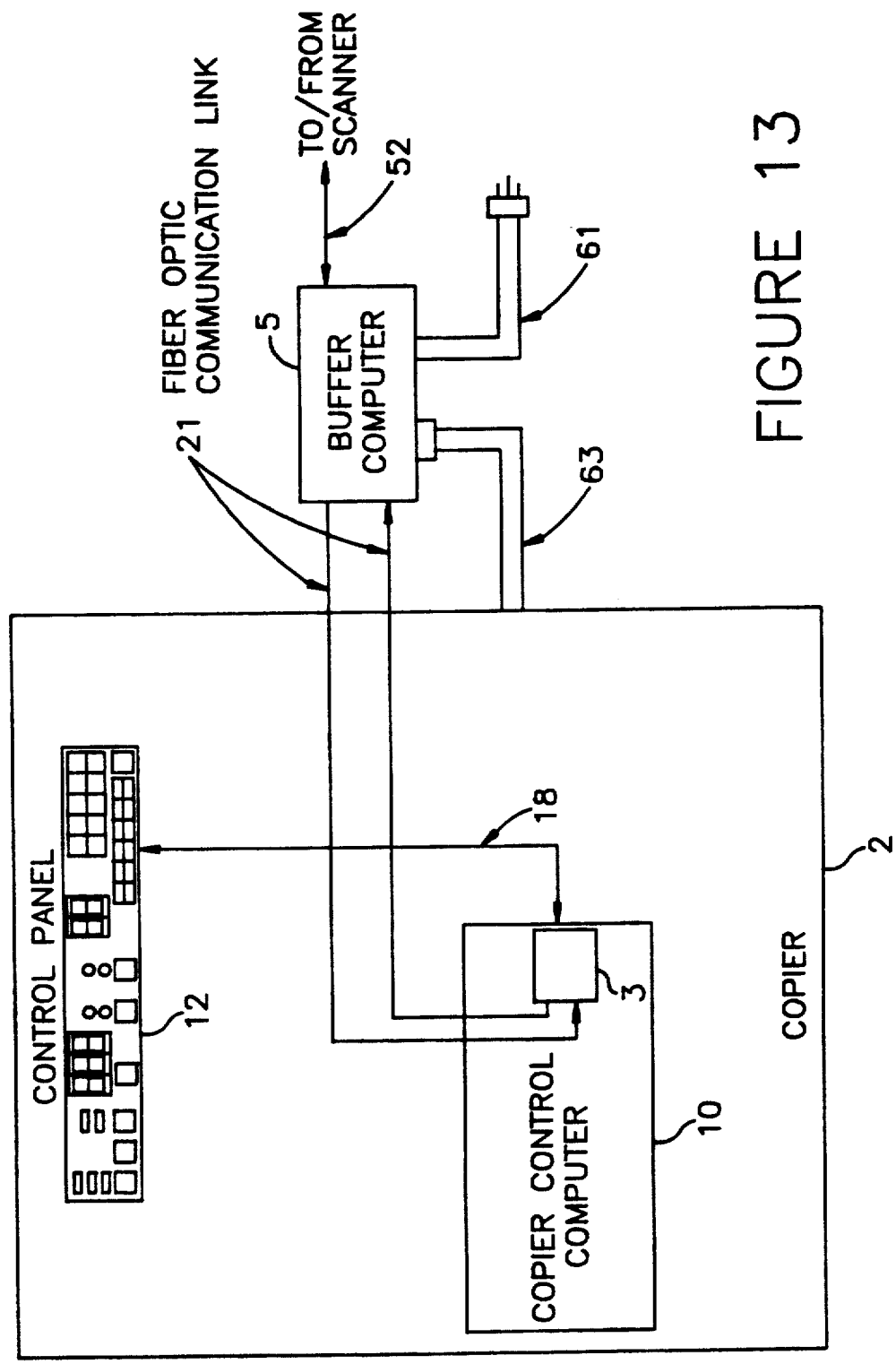
FIG. 13 is a schematic block diagram of a copier receiving power via the buffer node computer.

Another feature that can be added to the buffer node computer 5 outside of its communication function is the ability to remotely power-down one or more of the network copiers 2 to prevent unauthorized use. This is accomplished by having the copier 2 receive power via the buffer node computer 5, placed in series between the copier 2 and wall outlet, instead of directly from a wall outlet as shown in FIG. 13. The buffer node computer 5 would receive power directly from a power cord 61, while switching the power line 63 to the copier or even an auditron to prevent unauthorized use.

Figure 14:
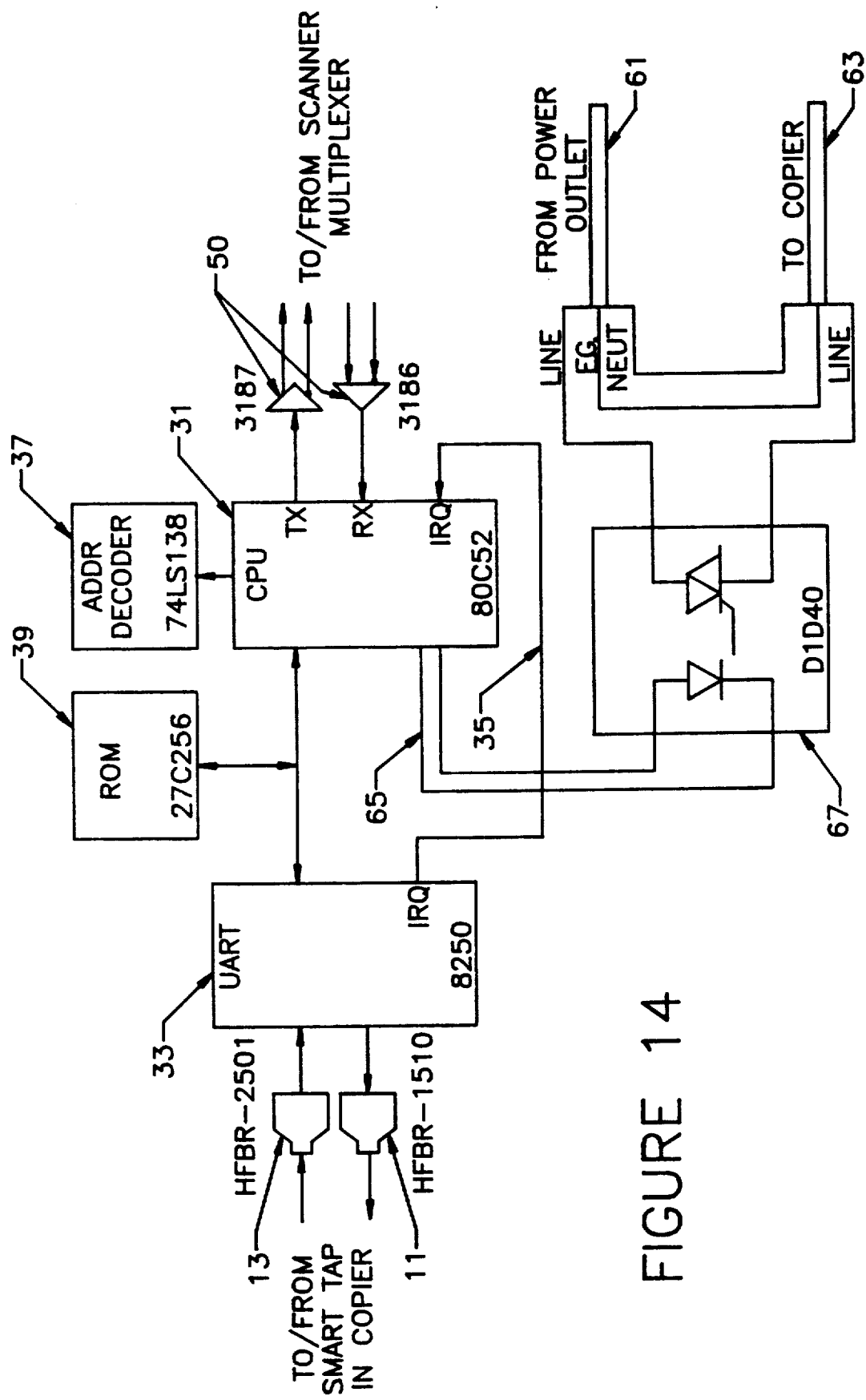
FIG. 14 is a schematic block diagram of a buffer node computer with a copier power switching capability.

The probable switching technique, shown in FIG. 14 would be to use a control line 65 from a digital port of the CPU 31 to drive the input of a solid state relay 67 (an optically isolated triac, such as a Cydrom D1D41). A copier enable/disable code would be issued by the data collection computer 16 at a preset time if desired, to shut down the copier 2. Power could then be restored to the machine 2 the next morning in the same manner.

With regard to dynamic display systems, there are two types of data transmission methods usually used to pass control and text information to a control panel 12. These types are classified as "serial" and "parallel".

Figure 15:
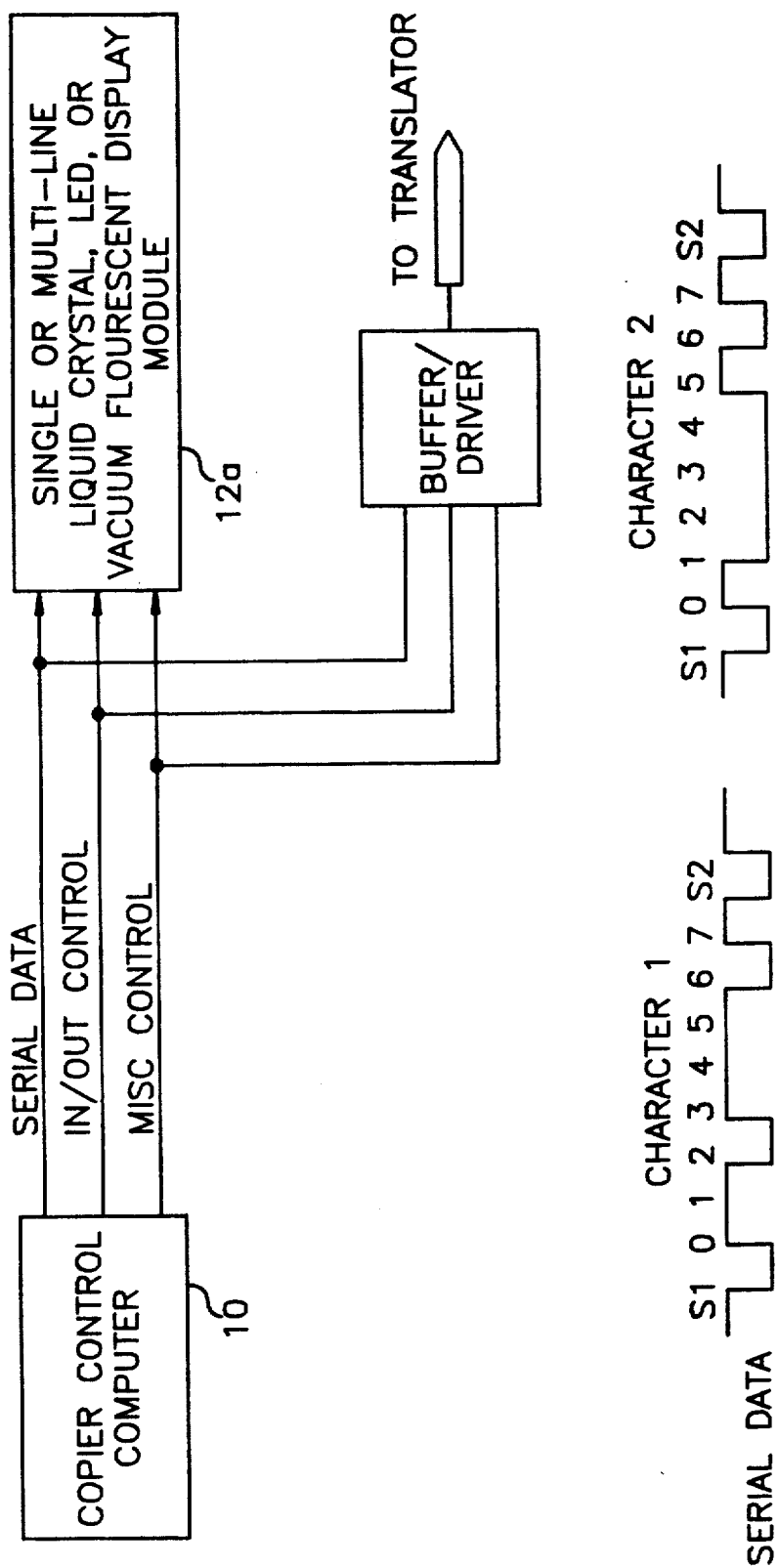
FIG. 15 is a schematic block diagram of a serial data transmission technique from a copier control computer to the control panel display.

With serial transmission, shown in FIG. 15, information is passed from the copier control computer 10 to the display element 12a in a stream, bit-by-bit, at a specific data rate (bit rate). Each 8-bit byte is preceeded by a start bit, i.e., S1, and terminated by a stop bit, i.e., S2 to allow the receiving device to synchronize and receive the incoming data.

In a parallel transmission system, shown in FIG. 16, information is passed from the copier control computer 10 to the receiving display element 12a synchronously as 8-bit bytes. Each byte is placed on the data bus and clocked into the receiving device via the strobe (ENABLE*).

In either case, the receiving display element 12a has some on-board intelligence (a dedicated function microcontroller) that processes the incoming data and formats it into the display output medium. This data can either be control commands or ASCII (text) characters. If it is a command, the display element 12a of the control panel 12 will interpret what actions are to be taken (such as initializing the display, positioning the cursor at a specific line or address, etc.). If the data is text, the visual representation of the character will appear at the current location of the display cursor.

Figure 17:
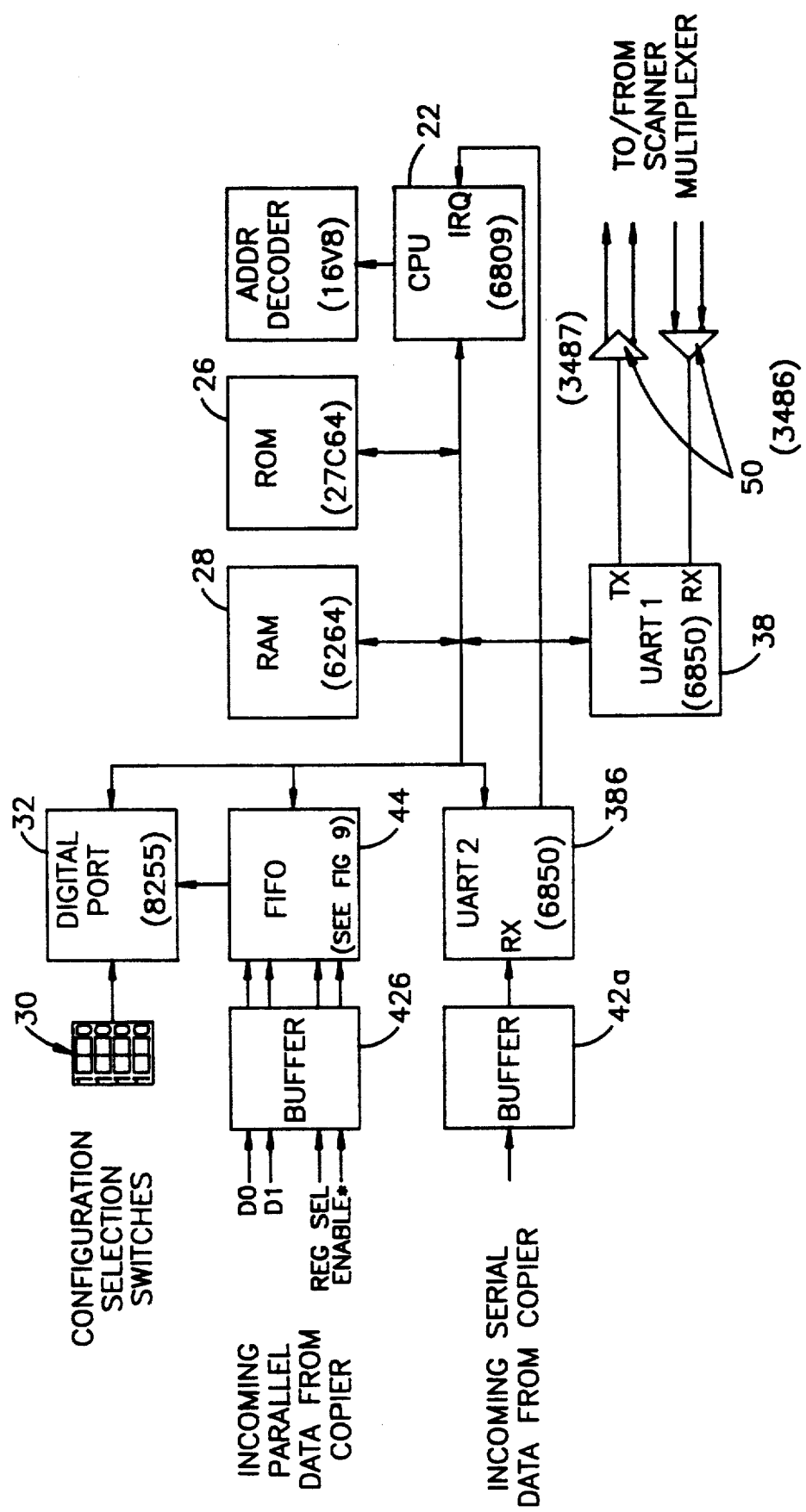
FIG. 17 is a schematic block diagram of a serial/parallel data version translator for use with the present invention.

The architecture for the translator 6 of the dynamic copier, shown in FIG. 17, is basically the same as for the static multiplexed data copier. The CPU 22, ROM 26, RAM 28, configuration switches 30 and UART1 38 functions remain the same. In addition, there are buffers 42, a second universal asynchronous receiver/transmitter (UART2) 38b and first-in-first-out (FIFO) memory 44. However, there is no background timer. A two component version translator for the dynamic copier is also available (not shown). The buffer node computer 5 will be the same. Minor changes to the active data tap will be necessary to compensate for the different copiers.

The dynamic translator 6 has the capability to accept either serial or parallel data from the data tap 8. Again, the CPU 22 can determine this from the configuration selection switches 30. These switches 30 are programmed to select the operating mode that the translator 6 will operate in, similar in principle to the translator 6 for multiplexed data that was described earlier. For example, one switch could be used to select between serial and parallel operating mode, i.e., 1=serial and 0=parallel data operation, etc.

The switches 30 are connected to the digital port 32 inputs. At power-up time the CPU 22 reads the digital port 32 to determine the operating mode under which it should continue.

If the serial mode is selected, the incoming serial data from the data tap 8 first passes through a buffer 42A to condition the signal to levels that are appropriate for the UART2 38b. During the initialization phase of the translator 6, the UART2 38b is internally configured by the CPU 22 with the necessary parameters to receive the incoming data. The serial data stream is then converted to parallel data for use by the CPU 22.

After each byte is assembled, UART2 38b interrupts the CPU 22 to inform it that it has another byte of data for it. After the CPU 22 has read the data in, it would be stored in RAM 28 for later evaluation. Determining the end of the data stream may be by inference, for example, if no additional characters are detected after a predetermined amount of time or if an end of transmission character is found.

In the parallel mode, the incoming parallel data from the data tap 8 is 8-bit wide bytes (D0-D7 of FIG. 16). The parallel bus also has control signals (REGISTER SELECT and READ/WRITE) and an enable signal that is asserted when the data and control signals are valid. All of this data initially passes through a buffer 42B until the enable signal is asserted and then is automatically forwarded into a first-in-first-out (FIFO) memory 44.

Figure 18:
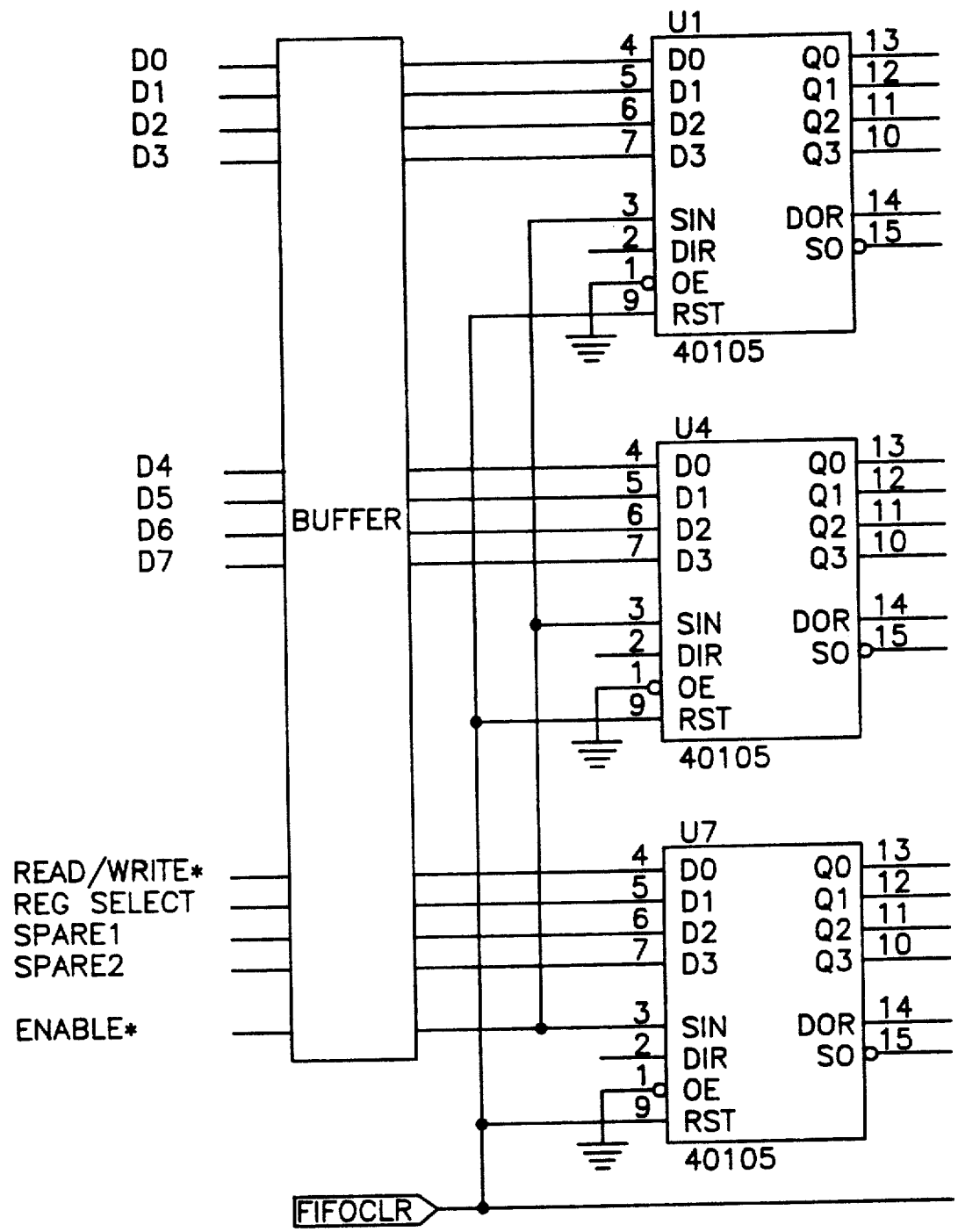
FIG. 18 is a schematic diagram of a 12×48 FIFO memory for a parallel interface translator.
Figure 18:
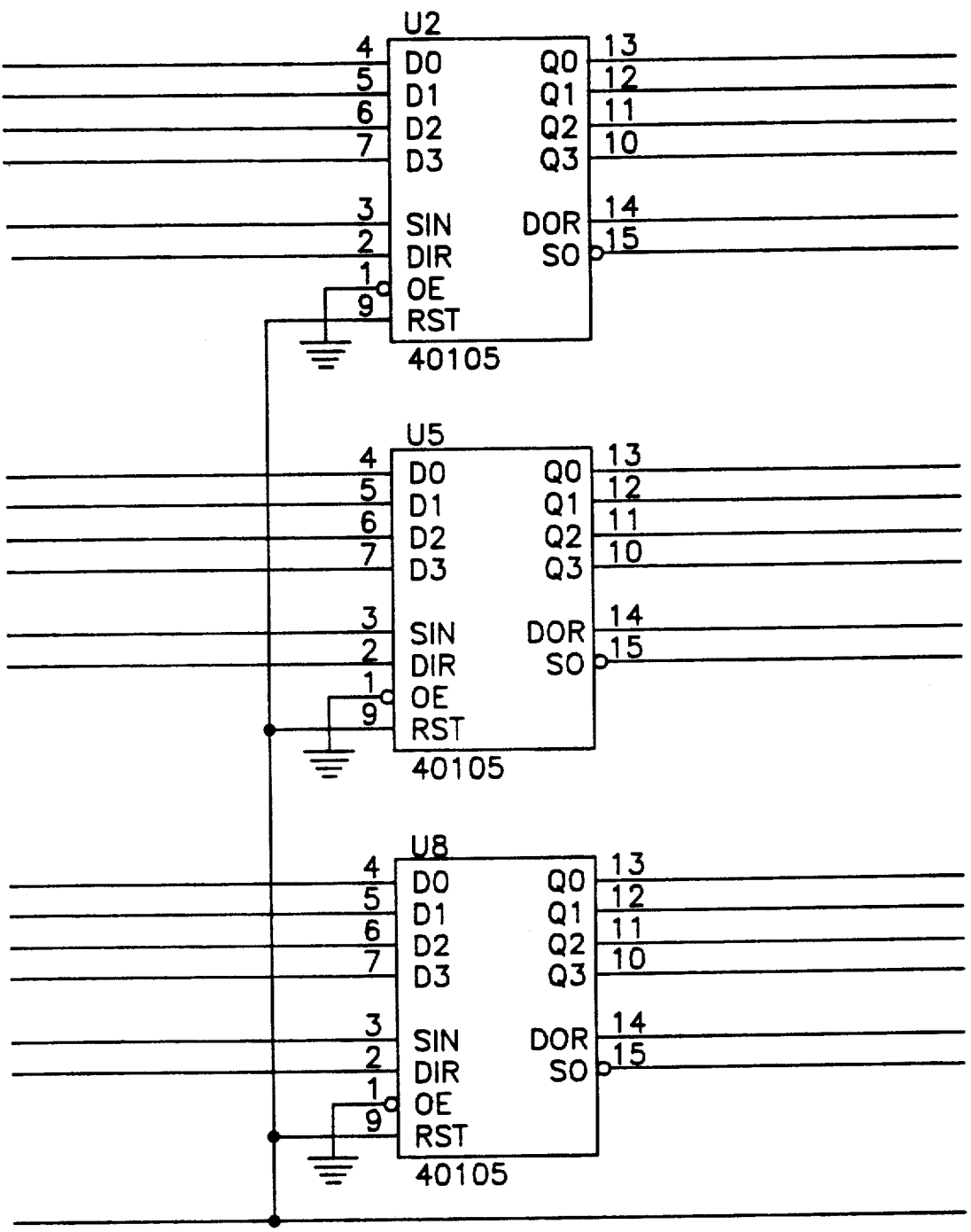
Figure 18:
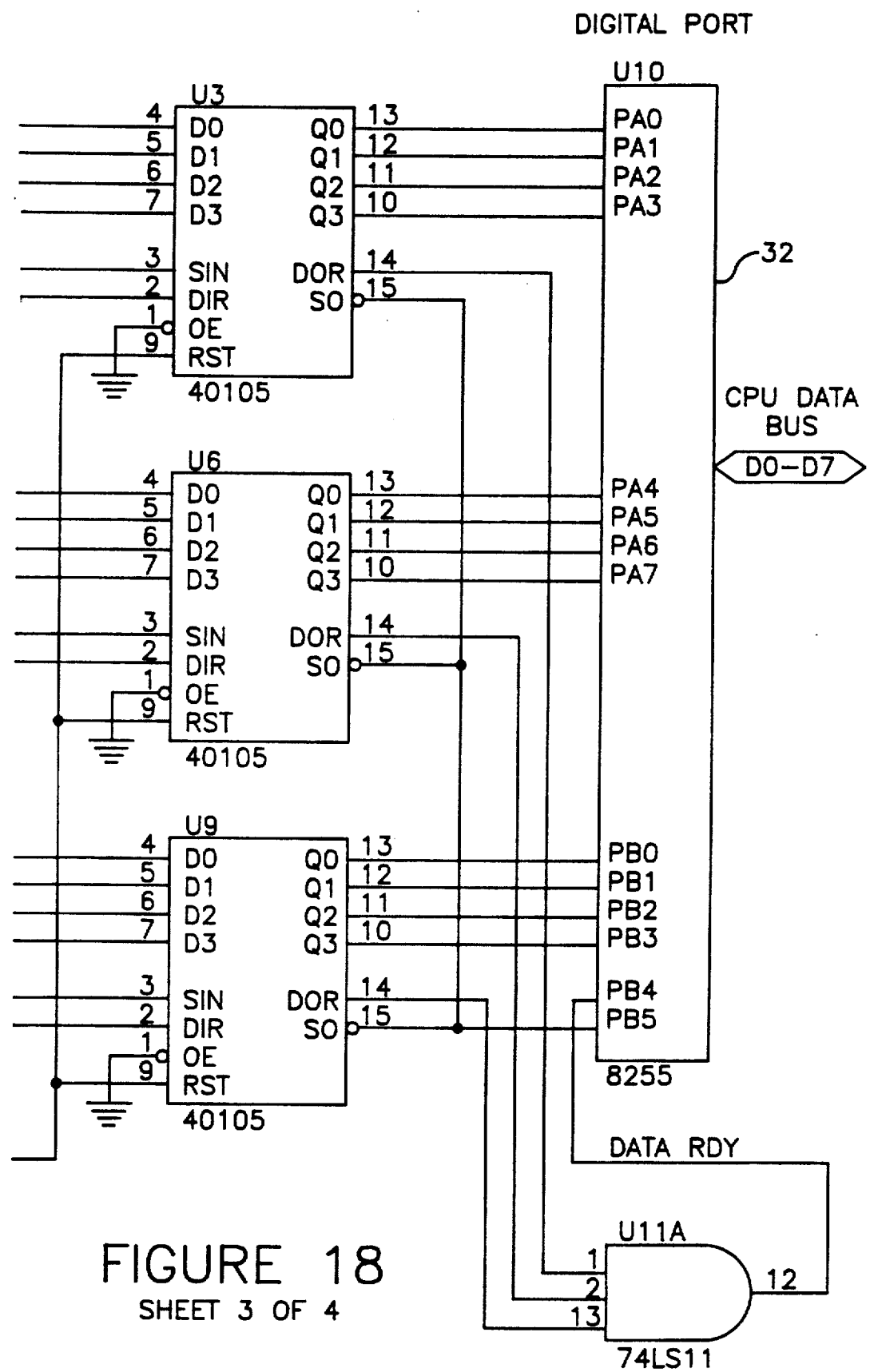
Figure 18:
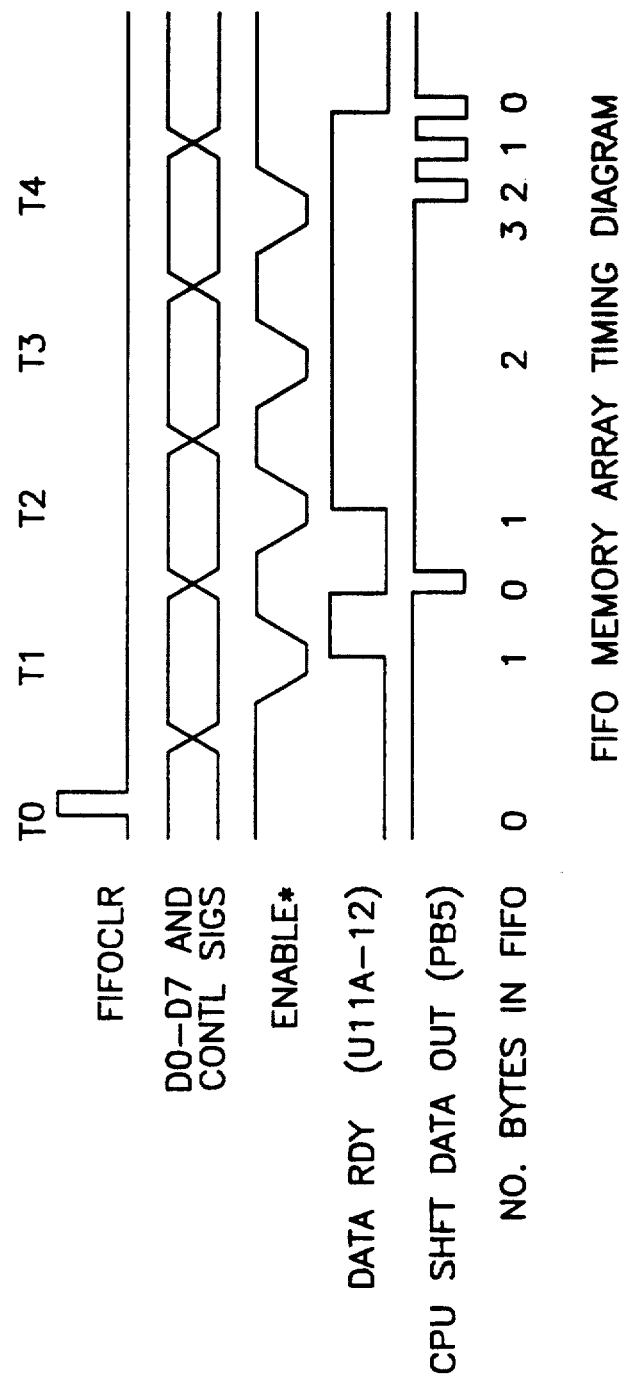

In the preferred embodiment, the FIFO memory 44 is constructed as shown in FIG. 18. This particular memory arrangement is created from a composite of nine smaller 4×16 bit FIFO's (comprising 40105 devices) so connected in series/parallel as to form a wider and deeper 12×48 bit FIFO 44. These devices receive parallel input from the copier 2 into the data inputs (D0-D3) of devices U1, U4 and U7. The data is clocked into this first bank by the ENABLE* clock from the copier 2. From there the data ripples to the back of the FIFO 44 (U3, U6 and U9) in a "bucket brigade" fashion and is presented to the inputs of the digital port 32.

As soon as the first 12-bit word has propagated to the back of the FIFO 44, the DATA RDY signal is sent by the 3-input AND gate (U11A) and is made available to the digital port 32. In this way the CPU 22 can poll the DATA RDY line to test for any data present in the FIFO 44. When the signal is sent, the CPU 22 reads the digital port 32 to extract the data and then pulse the PB5 line of the digital port 32 to cause the next word of the FIFO 44 to propagate up. The CPU 22 can also perform a master reset of the entire FIFO array by pulsing the FIFOCLR line, such as at T0.

As demonstrated in the FIFO memory timing diagram, the FIFO 44 fills with data as it is clocked in by ENABLE (T1, T2, T3 and T4) and is unloaded as it is clocked out by the CPU 22. Note that between T1 and T2 the FIFO memory 44 can absorb 48 words of data independently of the CPU 22 and can output the data to the CPU 22 independent of the copier 2. As with the serial interface method, the data is transferred to RAM 28 for buffering and evaluation.

The data stream that is passed by a dynamic copier 2 consists of discrete display commands and ASCII text characters. The translator 6 strips the control characters and sends the ASCII text stream to the central computer 16 for evaluation and formatting. There are several other approaches to evaluating such a data stream. For example, sending the data directly to the central computer 16, unaltered, and letting the central computer 16 evaluate or reformat the data. Also, parsing the data looking for key words and making an inference that a problem exists from the key words can be achieved. Data can then be sent (by token or text stream) to the central computer 16 for evaluation or reformatting.

The translators 6 are polled by the scanner 14 to obtain the most recent status information. At the translator location there are RS422 transmitter/receivers 50 (3486) that are wired to the scanner 14 at the central location 4. However, as stated above, the communication means for transmitting the status information from the translator 6 to the scanner 14 is not limited to hard wiring.

The scanner 14 is controlled by the data collection computer 16 and acts as a multiplex switcher which receives a message from the data collection computer 16 on which translator 6 to poll. The scanner 14 then makes cross connection to the appropriate translator 6 and passes the information to the data collection computer 16.

The scanner/multiplexer 14 can be any one of a number of such devices and are well known in the art. One example is a six port auto switch manufactured by L TEX ELECTRONICS under the name SMART 6.

Possibilities for the polling of the translators 6 include separate communication lines 52 for each translator 6, having the scanner 14 send a request to each unit in sequential round-robin fashion (shown in FIG. 1) or to daisy-chain the translators 6 together on a common line in a connected or unconnected ring wherein the scanner 14 would put the translator identifier of the unit being polled on the line 52.

The overall remote monitoring of the network is controlled by the data collection computer 16. The monitoring has two modes, quasi-real-time or real-time. Quasi-real-time monitoring is the normal mode of operation when the data collection computer 16 is polling each individual copier 2 without giving priority to a specific location. For example, if there are 25 copiers being polled at the rate of one/second, then the entire sampling base is updated in 25 seconds. Therefore, the status of any given copier 2 in the network will be current to within the past twenty-five seconds.

Real-time monitoring is accomplished in a special operating mode that causes the data collection computer 16 to focus in on a particular copier 2 and only poll the other copiers 2 as a background task and at a significantly lower rate. This allows the data collection computer 16 to sample the status of that particular copier 2 at a rate that will not appear to have any delay between the time an event occurs at the copier 2 and the time at which it is reported.

The data collection computer 16 can be an IBM compatible personal computer consisting of a monitor, keyboard, CPU, floppy drive, hard disk drive, and 640K of Random Access Memory running DOS 3.3. The data collection computer 16 assembles the status information into various display formats. Some of the user features are displayed in the Menu Selection Tree (FIGS. 20A-20E). These features enable a database of information on copiers by manufacturer, model, options, location, facilities, etc. to be built. The database would then be merged with the status information to present a current representation of status of all copiers 2 on the monitoring network. Copiers 2 with operational problems are easily identified and service requests made and tracked in like manner.

All of the stored information can also be utilized for a wide variety of report generation. It can also be used to predict potential or future machine failures. A rise in a certain type of fault could be detected and flagged as an upcoming failure. This type of window detection is similar to what the RIC system Xerox uses. However, the said system is a continuously on-line, real-time monitoring system. The present system could also alert a dispatch office automatically of pending or existing copier problems.

When the data collection computer 16 is operating in the real-time mode the user is able to view an actual representation of the copier control panel 12 on the CRT screen of the data collection computer 16.

FIG. 21 is an actual screen dump of the monitoring mode for a Xerox 1025 copier. By having a copy of the control panel information, such a screen can be created and maintained for virtually any copier, whether or not the panel consists of a simple indicators (the static panel) or textual display characters (the dynamic panel). It then becomes a matter of processing the data against a map of the display layout of a given copier 2 to arrive at the end result. The screen of FIG. 22 shows the current state of the ten major status indicators as well as the copier setup parameters, copy count and error codes, in the event of a copier fault.

The advantages gained by having a remote key operator or service personnel being able to view an actual representation of any copier 2 is extremely valuable. It allows an experienced person to view actual machine conditions first hand and also allows them to guide a less experienced individual at the remote machine site. An additional benefit of this real-time monitoring technique is that a person in a totally separate facility or town via a modem telephone link can view the actual status panel of a copier 2 to suggest possible solutions to a problem. If a copier fault occurs, a copier fault code is displayed on the control panel 12. Through software this fault code can be converted by the data collection computer 16 into an on-line help facility to said a key operator in correcting non-technical faults, as shown in FIG. 22.

EXAMPLE

An error status signal sent from the copier controller computer 10 to the control panel 12 is intercepted by the passive data tap 8, comprising a Y-tap 17. The data is transmitted to a translator 6 by means of a data translator cable 20. The translator 6 has modular jacks which accept cooperating jacks on the translator data cable 20.

The translator 6 being polled for information then transmits data readable by the multiplexer/scanner 14 and stores certain data. The translator 6 then transmits data to the scanner/multiplexer 14 at the central location along line 52 by the use of line drivers/receivers 50 (RS 422). Similarly, line 52 has modular jacks at each end which cooperate with jacks on both the translator and scanner/multiplexer 14.

The scanner/multiplexer 14 is controlled by a program in the data collection computer 16 under DOS 3.3. As such, the scanner/multiplexer 14 is integrated into the data collection computer 16.

A user interface comprising a personal computer, including a CRT, keyboard and CPU, to extract other information, is used to alert the user to the location and status of an error.

Variations of the present invention will make themselves apparent to those of ordinary skill in the art and are intended to fall within the spirit and scope of the invention, limited only by the appended claims.

We claim:

1. A system for automatically monitoring the operational status of and initiating operational commands in one or more copy machines from a remote location, each copy machine having a copy machine control computer for monitoring copy machine status information and controlling operation of the copy machine and a control panel for user interaction at the copy machine, comprising interface means associated with each copy machine including means to access status information rom the copy machine control computer for transmission to the remote location and means to receive operation commands from the remote location for execution by the copy machine control computer, communication means between the interface means and the remote location, means to remotely monitor the status information from the copy machine control computer at the remote location and means to initiate operation commands at the remote location for execution by the copy machine control computer thereby remotely activating copy machine functions wherein the means to initiate operation commands at the remote location comprises means to remotely input copy machine commands at the remote location, means to direct the commands to a specific copy machine from the remote location and means to simulate keystrokes on the copy machine control panel at the copy machine comprising a set of latches in the interface means in parallel with copy machine operations keys on the copy machine control panel, read by the copy machine control computer.

2. A system for automatically monitoring the operational status of and initiating operational commands in one or more copy machines from a remote location, each copy machine having a copy machine control computer for monitoring copy machine status information and controlling operation of the copy machine and a control panel for user interaction at the copy machine, comprising interface means associated with each copy machine including means to access status information from the copy machine control computer for transmission to the remote location and means to receive operation commands from the remote location for execution by the copy machine control computer, communication means between the interface mans and the remote location, means to remotely monitor the status information from the copy machine control computer at the remote location, means to initiate operation commands at the remote location for execution by the copy machine control computer thereby remotely activating copy machine functions and means to read keystrokes entered on the copy machine control panel from the remote location comprising a predetermined number of latches within the interface means, said latches capturing column sense signals generated by keystrokes on the copy machine control panel and read by the copy machine control computer to activate a specific function, which are read by the interface means for transmission to the remote location.

* * * * *